United States Patent
Hoshino et al.

(10) Patent No.: US 7,603,793 B2
(45) Date of Patent: *Oct. 20, 2009

(54) END-FACE HEATING APPARATUS, END-FACE DRYING METHOD FOR HONEYCOMB AGGREGATED BODY, AND METHOD FOR MANUFACTURING HONEYCOMB STRUCTURED BODY

(75) Inventors: Takafumi Hoshino, Gifu (JP); Koji Takahashi, Gifu (JP); Tomonori Ban, Gifu (JP)

(73) Assignee: Ibeden Co., Ltd., Ogaki-Shi (JP)

( * ) Notice: Subject to any disclaimer, the term of this patent is extended or adjusted under 35 U.S.C. 154(b) by 267 days.

This patent is subject to a terminal disclaimer.

(21) Appl. No.: 11/606,173

(22) Filed: Nov. 30, 2006

(65) Prior Publication Data

US 2007/0199205 A1    Aug. 30, 2007

(30) Foreign Application Priority Data

Feb. 24, 2006    (WO) ................. PCT/JP2006/303450

(51) Int. Cl.
*F26B 3/34* (2006.01)
(52) U.S. Cl. .............................. 34/245; 34/437; 34/497; 428/116; 264/148; 55/523; 269/9
(58) Field of Classification Search ............. 34/245, 34/437, 380, 381, 413, 497, 509; 428/116; 264/148; 55/523; 269/9
See application file for complete search history.

(56) References Cited

U.S. PATENT DOCUMENTS

| | | | | |
|---|---|---|---|---|
| 3,238,087 | A | * | 3/1966 | Norwalk et al. ............. 428/417 |
| 3,444,925 | A | * | 5/1969 | Johnson ....................... 165/166 |
| 3,547,727 | A | | 12/1970 | Anderson |
| 3,554,929 | A | * | 1/1971 | Aarons ......................... 502/178 |
| 3,755,204 | A | * | 8/1973 | Sergeys ....................... 502/241 |
| 3,771,592 | A | * | 11/1973 | Sayers ......................... 165/10 |
| 3,917,781 | A | * | 11/1975 | Gabriel et al. ................ 264/71 |
| 4,020,896 | A | * | 5/1977 | Mold et al. ................... 165/10 |

(Continued)

FOREIGN PATENT DOCUMENTS

EP    1 625 923    2/2006

(Continued)

OTHER PUBLICATIONS

Yamada, "Die for Extrusion-Molding and Method for Manufacturing Porous Ceramic Member", U.S. Appl. No. 11/541,724, filed Oct. 3, 2006.

(Continued)

*Primary Examiner*—Stephen M. Gravini
(74) *Attorney, Agent, or Firm*—Finnegan, Henderson, Farabow, Garrett & Dunner LLP

(57) ABSTRACT

An end-face heating apparatus of the present invention comprises: a heating tool that is placed almost in parallel with an end face of a honeycomb aggregated body in which a plurality of pillar-shaped honeycomb fired bodies are integrated with one another by interposing a sealing material paste layer formed on the side face of the honeycomb fired body; a heating tool translation device for translating said heating tool toward said honeycomb aggregated body; and a holding jig that holds said honeycomb aggregated body.

5 Claims, 5 Drawing Sheets

U.S. PATENT DOCUMENTS

| | | | |
|---|---|---|---|
| 4,290,586 A * | 9/1981 | Kane et al. | 266/80 |
| 4,304,585 A * | 12/1981 | Oda et al. | 65/43 |
| 4,357,987 A * | 11/1982 | Oda et al. | 165/10 |
| 4,411,856 A * | 10/1983 | Montierth | 264/267 |
| 4,419,108 A * | 12/1983 | Frost et al. | 95/286 |
| 4,489,774 A * | 12/1984 | Ogawa et al. | 165/10 |
| 4,523,528 A * | 6/1985 | Hastings et al. | 109/42 |
| 4,572,862 A * | 2/1986 | Ellis | 442/136 |
| 4,588,443 A * | 5/1986 | Bache | 106/644 |
| 4,591,383 A * | 5/1986 | McGarry et al. | 75/407 |
| 4,639,388 A * | 1/1987 | Ainsworth et al. | 428/117 |
| 4,642,210 A * | 2/1987 | Ogawa et al. | 264/631 |
| 4,662,288 A * | 5/1987 | Hastings et al. | 109/2 |
| 4,670,205 A * | 6/1987 | Montierth | 264/71 |
| 4,715,576 A * | 12/1987 | Montierth | 249/60 |
| 4,715,801 A * | 12/1987 | Montierth | 425/110 |
| 4,752,516 A * | 6/1988 | Montierth | 428/117 |
| 4,766,420 A * | 8/1988 | Hastings et al. | 340/550 |
| 4,818,595 A * | 4/1989 | Ellis | 442/68 |
| 4,871,495 A * | 10/1989 | Helferich et al. | 264/43 |
| 4,956,137 A * | 9/1990 | Dwivedi | 264/642 |
| 4,976,760 A * | 12/1990 | Helferich et al. | 55/487 |
| 5,015,610 A * | 5/1991 | Dwivedi | 501/127 |
| 5,130,184 A * | 7/1992 | Ellis | 442/295 |
| 5,139,977 A * | 8/1992 | Dwivedi | 501/127 |
| 5,194,154 A * | 3/1993 | Moyer et al. | 210/510.1 |
| 5,252,272 A * | 10/1993 | Yavuz et al. | 264/630 |
| 5,286,323 A * | 2/1994 | Bagley | 156/89.23 |
| 5,304,520 A * | 4/1994 | Dwivedi | 501/127 |
| 5,308,556 A * | 5/1994 | Bagley | 264/13 |
| 5,340,516 A * | 8/1994 | Yavuz et al. | 264/630 |
| 5,385,764 A * | 1/1995 | Andersen et al. | 428/34.4 |
| 5,453,310 A * | 9/1995 | Andersen et al. | 428/34.4 |
| 5,514,430 A * | 5/1996 | Andersen et al. | 428/34.4 |
| 5,545,297 A * | 8/1996 | Andersen et al. | 264/102 |
| 5,545,450 A * | 8/1996 | Andersen et al. | 428/34.5 |
| 5,549,859 A * | 8/1996 | Andersen et al. | 264/102 |
| 5,585,190 A * | 12/1996 | Newkirk et al. | 428/469 |
| 5,597,518 A * | 1/1997 | Lovoi | 264/1.21 |
| 5,601,626 A * | 2/1997 | Hori et al. | 55/493 |
| 5,625,084 A * | 4/1997 | Pitchai et al. | 549/536 |
| 5,631,052 A * | 5/1997 | Andersen et al. | 428/34.5 |
| 5,654,048 A * | 8/1997 | Andersen et al. | 428/34.5 |
| 5,658,603 A * | 8/1997 | Andersen et al. | 425/532 |
| 5,658,624 A * | 8/1997 | Anderson et al. | 428/34.7 |
| 5,686,380 A * | 11/1997 | Pitchai et al. | 502/347 |
| 5,691,014 A * | 11/1997 | Andersen et al. | 428/34.5 |
| 5,702,787 A * | 12/1997 | Andersen et al. | 428/36.4 |
| 5,705,237 A * | 1/1998 | Andersen et al. | 428/34.4 |
| 5,705,239 A * | 1/1998 | Andersen et al. | 428/34.5 |
| 5,763,630 A * | 6/1998 | Kahn et al. | 549/534 |
| 5,798,151 A * | 8/1998 | Andersen et al. | 428/34.5 |
| 5,820,967 A * | 10/1998 | Gadkaree | 428/116 |
| 5,830,305 A * | 11/1998 | Andersen et al. | 156/242 |
| 5,830,548 A * | 11/1998 | Andersen et al. | 428/36.4 |
| 5,869,010 A * | 2/1999 | Langer | 422/179 |
| 5,876,550 A * | 3/1999 | Feygin et al. | 156/264 |
| 5,914,187 A * | 6/1999 | Naruse et al. | 428/327 |
| 6,083,870 A * | 7/2000 | Kahn et al. | 502/340 |
| 6,093,503 A * | 7/2000 | Isoyama et al. | 429/61 |
| 6,097,011 A * | 8/2000 | Gadkaree et al. | 219/553 |
| 6,103,392 A * | 8/2000 | Dorfman et al. | 428/570 |
| 6,126,833 A * | 10/2000 | Stobbe et al. | 210/650 |
| 6,299,958 B1 * | 10/2001 | St. Julien et al. | 428/73 |
| 6,357,332 B1 * | 3/2002 | Vecchio | 89/36.02 |
| 6,413,895 B1 * | 7/2002 | Merkel | 501/134 |
| 6,576,579 B2 * | 6/2003 | Merkel | 501/102 |
| 6,582,651 B1 * | 6/2003 | Cochran et al. | 419/5 |
| 6,649,563 B2 * | 11/2003 | Nakanishi et al. | 502/439 |
| 6,667,097 B2 * | 12/2003 | Tokarsky et al. | 428/364 |
| 6,669,751 B1 | 12/2003 | Ohno et al. | |
| 6,841,243 B2 * | 1/2005 | Tokarsky et al. | 428/364 |
| 6,863,705 B2 * | 3/2005 | Ishihara et al. | 55/523 |
| 6,905,777 B2 * | 6/2005 | Near | 428/469 |
| 6,919,130 B2 * | 7/2005 | Tokarsky et al. | 428/357 |
| 7,014,934 B2 * | 3/2006 | Novak | 429/32 |
| 7,034,660 B2 * | 4/2006 | Watters et al. | 340/10.41 |
| 7,037,865 B1 * | 5/2006 | Kimberly | 442/181 |
| 7,052,760 B2 * | 5/2006 | Hijikata | 428/116 |
| 7,112,233 B2 | 9/2006 | Ohno et al. | |
| 7,118,706 B2 * | 10/2006 | Miyakawa | 264/647 |
| 7,309,370 B2 | 12/2007 | Kudo et al. | |
| 7,311,750 B2 * | 12/2007 | Ohno et al. | 55/523 |
| 7,316,722 B2 * | 1/2008 | Komori et al. | 55/523 |
| 7,326,270 B2 * | 2/2008 | Hong et al. | 55/523 |
| 7,332,014 B2 | 2/2008 | Ono et al. | |
| 7,341,614 B2 | 3/2008 | Hayashi et al. | |
| 7,348,049 B2 * | 3/2008 | Yoshida, Yutaka | 428/116 |
| 7,387,829 B2 | 6/2008 | Ohno et al. | |
| 7,393,376 B2 | 7/2008 | Taoka et al. | |
| 7,396,586 B2 | 7/2008 | Ohno et al. | |
| 7,413,694 B2 * | 8/2008 | Waldrop et al. | 264/257 |
| 7,427,308 B2 | 9/2008 | Taoka et al. | |
| 7,427,309 B2 | 9/2008 | Ohno et al. | |
| 7,438,967 B2 | 10/2008 | Fujita | |
| 7,449,427 B2 * | 11/2008 | Ohno et al. | 502/439 |
| 7,455,709 B2 * | 11/2008 | Ohno et al. | 55/523 |
| 7,462,216 B2 | 12/2008 | Kunieda et al. | |
| 7,473,465 B2 | 1/2009 | Ohno et al. | |
| 7,485,170 B2 * | 2/2009 | Beall et al. | 55/523 |
| 7,504,359 B2 * | 3/2009 | Ogyu et al. | 502/439 |
| 7,517,502 B2 * | 4/2009 | Ohno et al. | 422/177 |
| 7,520,178 B2 * | 4/2009 | Ohno et al. | 73/799 |
| 7,521,025 B2 * | 4/2009 | Ohno et al. | 422/168 |
| 7,524,350 B2 * | 4/2009 | Kunieda | 55/523 |
| 7,540,898 B2 * | 6/2009 | Oshimi | 55/523 |
| 7,543,513 B2 * | 6/2009 | Kobayashi et al. | 73/865.9 |
| 2002/0022422 A1 * | 2/2002 | Waldrop et al. | 442/179 |
| 2002/0140137 A1 | 10/2002 | Sapieszko et al. | 264/629 |
| 2002/0154029 A1 * | 10/2002 | Watters et al. | 340/870.07 |
| 2002/0185787 A1 * | 12/2002 | Miyakawa | 264/647 |
| 2003/0041575 A1 * | 3/2003 | Ishihara et al. | 55/523 |
| 2003/0175513 A1 * | 9/2003 | Tokarsky et al. | 428/364 |
| 2003/0190408 A1 * | 10/2003 | Moini et al. | 427/8 |
| 2004/0028875 A1 * | 2/2004 | Van Rijn et al. | 428/98 |
| 2004/0058152 A1 * | 3/2004 | Tokarsky et al. | 428/373 |
| 2004/0076794 A1 * | 4/2004 | Hijikata | 428/116 |
| 2004/0131533 A1 * | 7/2004 | Spacie et al. | 423/448 |
| 2004/0161596 A1 * | 8/2004 | Taoka et al. | 428/304.4 |
| 2004/0209092 A1 * | 10/2004 | Near | 428/472.2 |
| 2004/0219358 A1 * | 11/2004 | Tokarsky et al. | 428/364 |
| 2005/0016140 A1 * | 1/2005 | Komori et al. | 55/523 |
| 2005/0016141 A1 * | 1/2005 | Hong et al. | 55/523 |
| 2005/0025956 A1 * | 2/2005 | Bainbridge | 428/317.3 |
| 2005/0109023 A1 | 5/2005 | Kudo et al. | |
| 2005/0153099 A1 * | 7/2005 | Yamada | 428/117 |
| 2005/0160710 A1 * | 7/2005 | Taoka et al. | 55/523 |
| 2005/0169819 A1 | 8/2005 | Shibata | |
| 2005/0175514 A1 | 8/2005 | Ohno | |
| 2005/0180898 A1 | 8/2005 | Yamada | |
| 2005/0208356 A1 * | 9/2005 | Amino | 429/31 |
| 2005/0214504 A1 * | 9/2005 | Yoshida | 428/116 |
| 2005/0229565 A1 * | 10/2005 | Yoshida | 55/523 |
| 2005/0232828 A1 * | 10/2005 | Merry | 422/179 |
| 2005/0247038 A1 | 11/2005 | Takahashi | |
| 2005/0266991 A1 * | 12/2005 | Ohno et al. | 502/439 |
| 2005/0272602 A1 | 12/2005 | Ninomiya | |
| 2005/0281999 A1 * | 12/2005 | Hofmann et al. | 428/304.4 |
| 2006/0019061 A1 * | 1/2006 | Oshimi | 428/116 |
| 2006/0029897 A1 | 2/2006 | Saijo et al. | |
| 2006/0029898 A1 | 2/2006 | Saijo et al. | |
| 2006/0032203 A1 * | 2/2006 | Komori et al. | 55/523 |
| 2006/0043652 A1 | 3/2006 | Saijo et al. | |
| 2006/0051556 A1 | 3/2006 | Ohno et al. | |

| | | | |
|---|---|---|---|
| 2006/0068159 A1* | 3/2006 | Komori et al. ............... 428/116 |
| 2006/0073970 A1 | 4/2006 | Yamada |
| 2006/0075731 A1* | 4/2006 | Ohno et al. .................... 55/523 |
| 2006/0093784 A1* | 5/2006 | Komori et al. ............... 428/116 |
| 2006/0108347 A1 | 5/2006 | Koyama et al. |
| 2006/0118546 A1 | 6/2006 | Saijo |
| 2006/0135343 A1* | 6/2006 | Ohno et al. .................... 501/80 |
| 2006/0138692 A1* | 6/2006 | Suzuki et al. ............... 264/46.6 |
| 2006/0159602 A1* | 7/2006 | Ohno et al. .................. 422/211 |
| 2006/0165973 A1* | 7/2006 | Dumm et al. ................ 428/323 |
| 2006/0166820 A1 | 7/2006 | Ogyu et al. |
| 2006/0170535 A1* | 8/2006 | Watters et al. ........... 340/10.41 |
| 2006/0172113 A1* | 8/2006 | Kunieda ...................... 428/116 |
| 2006/0177629 A1* | 8/2006 | Kunieda ...................... 428/116 |
| 2006/0179803 A1* | 8/2006 | Ohno et al. .................... 55/523 |
| 2006/0188415 A1* | 8/2006 | Ohno et al. .................. 422/177 |
| 2006/0194018 A1* | 8/2006 | Ohno et al. .................. 428/116 |
| 2006/0197264 A1* | 9/2006 | Cutler et al. .................. 264/618 |
| 2006/0201090 A1* | 9/2006 | Guevara et al. ........... 52/309.12 |
| 2006/0210765 A1 | 9/2006 | Ohno et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0225833 A1 | 10/2006 | Fujita et al. |
| 2006/0230732 A1 | 10/2006 | Kunieda |
| 2006/0245465 A1 | 11/2006 | Saijo et al. |
| 2006/0254231 A1* | 11/2006 | Hayashi et al. ............... 55/523 |
| 2006/0254713 A1 | 11/2006 | Fujita et al. |
| 2006/0269722 A1 | 11/2006 | Yamada |
| 2006/0269738 A1* | 11/2006 | Kimberly .................... 428/323 |
| 2006/0292331 A1* | 12/2006 | Ohno et al. .................. 428/116 |
| 2006/0292336 A1* | 12/2006 | Ohno et al. .................. 428/116 |
| 2006/0292337 A1* | 12/2006 | Ohno et al. .................. 428/116 |
| 2006/0292338 A1* | 12/2006 | Ohno et al. .................. 428/116 |
| 2006/0292339 A1* | 12/2006 | Ohno et al. .................. 428/116 |
| 2006/0292340 A1* | 12/2006 | Ohno et al. .................. 428/116 |
| 2006/0292393 A1* | 12/2006 | Kunieda ...................... 428/688 |
| 2007/0020155 A1 | 1/2007 | Ohno et al. |
| 2007/0028575 A1 | 2/2007 | Ohno et al. |
| 2007/0031819 A1* | 2/2007 | Koschwanez et al. ........... 435/4 |
| 2007/0044444 A1 | 3/2007 | Oshimi |
| 2007/0065348 A1* | 3/2007 | Ohno et al. .................. 422/178 |
| 2007/0068128 A1 | 3/2007 | Oshimi et al. |
| 2007/0085233 A1* | 4/2007 | Yamada ................... 264/177.12 |
| 2007/0116908 A1 | 5/2007 | Ohno et al. |
| 2007/0126160 A1 | 6/2007 | Takahashi |
| 2007/0128405 A1* | 6/2007 | Sakaguchi et al. ........... 428/116 |
| 2007/0130897 A1 | 6/2007 | Sakaguchi et al. |
| 2007/0144561 A1* | 6/2007 | Saijo et al. .................... 134/40 |
| 2007/0148402 A1* | 6/2007 | Ohno et al. .................. 428/116 |
| 2007/0148403 A1 | 6/2007 | Yamamura et al. |
| 2007/0152382 A1 | 7/2007 | Yamada et al. |
| 2007/0154728 A1* | 7/2007 | Ohno et al. .................. 428/593 |
| 2007/0169453 A1 | 7/2007 | Hayakawa |
| 2007/0172632 A1* | 7/2007 | Ohno et al. .................. 428/116 |
| 2007/0175060 A1 | 8/2007 | Idea et al. |
| 2007/0178275 A1 | 8/2007 | Takahashi |
| 2007/0187651 A1 | 8/2007 | Naruse et al. |
| 2007/0190350 A1 | 8/2007 | Ohno et al. |
| 2007/0196620 A1* | 8/2007 | Ohno et al. .................. 428/116 |
| 2007/0199205 A1* | 8/2007 | Hoshino et al. ............... 34/437 |
| 2007/0199643 A1 | 8/2007 | Kawai et al. |
| 2007/0202455 A1 | 8/2007 | Saijo et al. |
| 2007/0204580 A1 | 9/2007 | Kunieda |
| 2007/0212517 A1* | 9/2007 | Ohno et al. .................. 428/116 |
| 2007/0227109 A1* | 10/2007 | Hong et al. .................... 55/523 |
| 2007/0235895 A1 | 10/2007 | Yamamura et al. |
| 2007/0243283 A1 | 10/2007 | Yamamura et al. |
| 2007/0252498 A1 | 11/2007 | Wing |
| 2007/0262497 A1 | 11/2007 | Yamamura et al. |
| 2007/0262498 A1 | 11/2007 | Saijo et al. |
| 2007/0277431 A1* | 12/2007 | Ohno et al. .................... 44/358 |
| 2007/0277655 A1* | 12/2007 | Kawai et al. .................... 83/13 |
| 2007/0281127 A1* | 12/2007 | Backhaus-Ricoult et al. ............... 428/116 |
| 2007/0293392 A1 | 12/2007 | Ohno et al. |
| 2008/0006971 A1* | 1/2008 | Kawai et al. ................ 264/630 |
| 2008/0050557 A1* | 2/2008 | Beall et al. ................... 428/116 |
| 2008/0057267 A1* | 3/2008 | Brocheton et al. .......... 428/116 |
| 2008/0057290 A1* | 3/2008 | Guevara et al. ........... 428/312.4 |
| 2008/0067725 A1 | 3/2008 | Naruse et al. |
| 2008/0083202 A1* | 4/2008 | Kunieda et al. ............... 55/523 |
| 2008/0084010 A1 | 4/2008 | Naruse et al. |
| 2008/0085394 A1* | 4/2008 | Ohno et al. .................. 428/117 |
| 2008/0086993 A1* | 4/2008 | Komori et al. ............. 55/385.3 |
| 2008/0088072 A1 | 4/2008 | Koyashi |
| 2008/0106008 A1 | 5/2008 | Kasai et al. |
| 2008/0106009 A1 | 5/2008 | Naruse et al. |
| 2008/0110143 A1* | 5/2008 | Chen et al. .................. 55/385.1 |
| 2008/0111274 A1 | 5/2008 | Kawai et al. |
| 2008/0115597 A1 | 5/2008 | Ohno et al. |
| 2008/0116200 A1 | 5/2008 | Kawai et al. |
| 2008/0116601 A1 | 5/2008 | Naruse et al. |
| 2008/0118682 A1* | 5/2008 | Ido et al. ..................... 428/34.1 |
| 2008/0119355 A1* | 5/2008 | Ohno et al. .................. 502/340 |
| 2008/0120950 A1 | 5/2008 | Ohno et al. |
| 2008/0136053 A1 | 6/2008 | Kuribayashi et al. |
| 2008/0136062 A1* | 6/2008 | Kasai et al. .................. 264/426 |
| 2008/0138567 A1* | 6/2008 | Ninomiya et al. .......... 428/116 |
| 2008/0150200 A1 | 6/2008 | Tajima |
| 2008/0157445 A1 | 7/2008 | Kawai et al. |
| 2008/0160249 A1 | 7/2008 | Makino |
| 2008/0173293 A1* | 7/2008 | Baratta ........................ 125/15 |
| 2008/0174039 A1* | 7/2008 | Saijo et al. .................... 264/43 |
| 2008/0175764 A1* | 7/2008 | Sako .......................... 422/177 |
| 2008/0179781 A1 | 7/2008 | Iwata |
| 2008/0187713 A1* | 8/2008 | Ohno et al. .................. 428/116 |
| 2008/0190081 A1* | 8/2008 | Oshimi ...................... 55/385.3 |
| 2008/0190083 A1* | 8/2008 | Oshimi ......................... 55/521 |
| 2008/0193739 A1* | 8/2008 | Dickey et al. ............... 428/317.9 |
| 2008/0197544 A1* | 8/2008 | Saijo et al. ................... 264/671 |
| 2008/0202086 A1* | 8/2008 | Ohno et al. .................... 55/523 |
| 2008/0202087 A1* | 8/2008 | Ohno et al. .................... 55/524 |
| 2008/0203626 A1* | 8/2008 | Ohno et al. .................. 264/630 |
| 2008/0203627 A1* | 8/2008 | Ogunwumi et al. ......... 264/638 |
| 2008/0210212 A1* | 9/2008 | Baratta ........................ 125/15 |
| 2008/0211127 A1* | 9/2008 | Naruse et al. ............... 264/45.1 |
| 2008/0213141 A1* | 9/2008 | Pinchot ....................... 422/193 |
| 2008/0213485 A1 | 9/2008 | Shibata |
| 2008/0220112 A1* | 9/2008 | Waldrop et al. .......... 425/405.1 |
| 2008/0236115 A1 | 10/2008 | Sakashita |
| 2008/0236122 A1 | 10/2008 | Ito |
| 2008/0236394 A1* | 10/2008 | Ohno et al. ...................... 96/9 |
| 2008/0236724 A1 | 10/2008 | Higuchi |
| 2008/0237428 A1* | 10/2008 | Kobayashi et al. ...... 248/346.06 |
| 2008/0237941 A1* | 10/2008 | Ohno et al. .................. 264/630 |
| 2008/0237942 A1* | 10/2008 | Takamatsu ................. 264/682 |
| 2008/0241003 A1* | 10/2008 | Ido et al. ..................... 422/168 |
| 2008/0241005 A1* | 10/2008 | Ido et al. ..................... 422/177 |
| 2008/0241008 A1* | 10/2008 | Ido et al. ..................... 422/180 |
| 2008/0241009 A1* | 10/2008 | Ohno et al. .................. 422/180 |
| 2008/0241010 A1* | 10/2008 | Ohno et al. .................. 422/180 |
| 2008/0241011 A1* | 10/2008 | Ohno et al. .................. 422/180 |
| 2008/0241012 A1* | 10/2008 | Ohno et al. .................. 422/180 |
| 2008/0241013 A1* | 10/2008 | Ohno et al. .................. 422/180 |
| 2008/0241015 A1 | 10/2008 | Kudo et al. |
| 2008/0241444 A1 | 10/2008 | Oshimi |
| 2008/0241465 A1* | 10/2008 | Ido ............................. 428/116 |
| 2008/0241466 A1 | 10/2008 | Saito et al. |
| 2008/0241501 A1* | 10/2008 | Ohno et al. ............... 428/305.5 |
| 2008/0247918 A1* | 10/2008 | Ohno et al. .................. 422/180 |
| 2008/0251061 A1* | 10/2008 | Baratta ........................ 125/15 |
| 2008/0251977 A1* | 10/2008 | Naruse et al. ............... 264/630 |
| 2008/0260599 A1* | 10/2008 | Ohno et al. .................. 422/180 |
| 2008/0261806 A1* | 10/2008 | Konstandopoulos et al. ..502/303 |

| | | | |
|---|---|---|---|
| 2008/0284067 A1 | 11/2008 | Naruse et al. | |
| 2008/0286523 A1* | 11/2008 | Ohno et al. | 428/116 |
| 2008/0286524 A1* | 11/2008 | Ohno et al. | 428/116 |
| 2008/0292843 A1* | 11/2008 | Oya et al. | 428/116 |
| 2008/0305259 A1 | 12/2008 | Saijo | |
| 2008/0307760 A1* | 12/2008 | Chatlani et al. | 55/523 |
| 2008/0318001 A1* | 12/2008 | Sakakibara | 428/116 |
| 2009/0004431 A1* | 1/2009 | Ninomiya | 428/116 |
| 2009/0008142 A1* | 1/2009 | Shimizu et al. | 174/261 |
| 2009/0020924 A1* | 1/2009 | Lin | 264/605 |
| 2009/0033005 A1* | 2/2009 | Bookbinder et al. | 264/628 |
| 2009/0079111 A1* | 3/2009 | Kasai et al. | 264/489 |
| 2009/0095416 A1* | 4/2009 | Kunieda et al. | 156/280 |
| 2009/0098333 A1* | 4/2009 | Kunieda et al. | 428/116 |
| 2009/0113863 A1* | 5/2009 | Lu et al. | 55/523 |
| 2009/0130378 A1* | 5/2009 | Imaeda et al. | 428/116 |

FOREIGN PATENT DOCUMENTS

| | | |
|---|---|---|
| JP | 2001-96116 | 4/2001 |
| JP | 2004-262670 | 9/2004 |
| JP | 2004-291270 | 10/2004 |
| JP | 2005-154202 | 6/2005 |
| WO | WO 93/01048 | 1/1993 |

OTHER PUBLICATIONS

Saijo et al., "Degreasing Jig, Method for Degreasing Ceramic Molded Body, and Method for Manufacturing Honeycomb Structured Body", U.S. Appl. No. 11/604,682, filed Nov. 28, 2006.

Kawai et al., "Cutting Apparatus, Honeycomb Molded Body Cutting Method, and Honeycomb Structure Manufacturing Method", U.S. Appl. No. 11/513,115, filed Aug. 31, 2006.

Kawai et al., "End Face Processing Apparatus, End Face Processing System, End Face Processing Method for Honeycomb Molded Body, and Manufacturing Method for Honeycomb Structure", U.S. Appl. No. 11/546,417, filed Oct. 12, 2006.

U.S. Appl. No. 11/845,975.
U.S. Appl. No. 11/867,256.
U.S. Appl. No. 11/711,021.
U.S. Appl. No. 11/951,949.

* cited by examiner

A-A line cross-sectional view

END-FACE HEATING APPARATUS, END-FACE DRYING METHOD FOR HONEYCOMB AGGREGATED BODY, AND METHOD FOR MANUFACTURING HONEYCOMB STRUCTURED BODY

CROSS-REFERENCE TO RELATED APPLICATIONS

This application claims priority of PCT/JP2006/303450 filed on Feb. 24, 2006. The contents of this application are incorporated herein by reference in their entirety.

BACKGROUND OF THE INVENTION

1. Field of the Invention

The present invention relates to an end-face heating apparatus, a method for drying an end face of a honeycomb aggregated body, and a method for manufacturing a honeycomb structured body.

2. Discussion of the Background

In recent years, particulates such as soot and the like contained in exhaust gases discharged from internal combustion engines of vehicles, such as buses and trucks, and construction machines, have raised serious problems as those particulates are harmful to the environment and the human body.

There have been proposed various ceramic filters using a honeycomb structured body comprised of porous ceramics, which serve as filters capable of capturing particulates in exhaust gases to purify the exhaust gases.

FIG. 1 is a perspective view that schematically shows one example of such ceramic filters; FIG. 2A is a perspective view that schematically shows a honeycomb fired body that constitutes the ceramic filter; and FIG. 2B is a cross-sectional view taken along line A-A of FIG. 2A.

In a ceramic filter 130, a plurality of honeycomb fired bodies 140 as shown in FIGS. 2A and 2B are combined with one another by interposing sealing material layers (adhesive layers) 131 to form a ceramic block 133, and a sealing material layer (coat layer) 132 is formed on the periphery of this ceramic block 133.

Moreover, as shown in FIGS. 2A and 2B, the honeycomb fired body 140 has a structure in which a plurality of cells 141 are placed in parallel with one another in the longitudinal direction and a cell wall 143 between the cells 141 is allowed to function as a filter.

In other words, as shown in FIG. 2B, each of the cells 141, formed in the honeycomb fired body 140, is sealed by an opening-sealing material layer 142 at either one end of its exhaust gas-inlet or exhaust gas-outlet sides so that exhaust gases that flow into one of cells 141 are discharged from another cell 141 after surely passing through a cell wall 143 between cells 141, and accordingly, when exhaust gases pass through the cell wall 143, particulates are captured by the cell wall 143 portion so that the exhaust gases are purified.

Conventionally, in order to manufacture a ceramic filter 130 of this type, first, for example, ceramic powder, a binder, a dispersant solution and the like are mixed to prepare a wet mixture. This mixture is then continuously extrusion-molded through a die, and the extruded molded body is cut into a predetermined length to manufacture a rectangular pillar-shaped honeycomb molded body.

Then, the resulting honeycomb molded body is dried and after predetermined cells are sealed to make the cells under a state in which one of the end portions is sealed by the opening-sealing material layer, the result is subjected to degreasing and firing processes to manufacture a honeycomb fired body.

Thereafter, plural honeycomb fired bodies are integrated with one another by interposing a sealing material paste layer therebetween, to manufacture a honeycomb aggregated body. Then, the respective end faces of this honeycomb aggregated body is heated, the sealing material paste layer close to the end face is dried, and the entire sealing material paste layer is dried thereafter to form a sealing material layer (adhesive layer) on the honeycomb aggregated body.

Next, the resulting honeycomb aggregated body with the sealing material layer (adhesive layer) formed thereon is cut into a predetermined shape such as a cylindrical shape, a cylindroid shape or the like by using a cutting machine and the like to form a ceramic block, and lastly, a sealing material paste is applied to the periphery of the ceramic block to form a sealing material layer (coat layer), thereby completing the manufacturing process of a ceramic filter.

Normally, the ceramic filter thus manufactured is used in a state of being housed in a casing.

In the present specification, among the surfaces which form the outer contour of any of the honeycomb molded body, honeycomb fired body, honeycomb aggregated body, ceramic filter and honeycomb structured body, the surface of which the cells are exposed are referred to as an "end face" and the surface other than the end face is referred to as a "side face".

With respect to the method for heating the end face of the honeycomb aggregated body, and drying the sealing material paste layer on a proximate portion of the end face, in the method for manufacturing the ceramic filter as mentioned above, JP-A 2004-291270 discloses, for example, a method for jointing a ceramic structured body in which a plurality of ceramic structured bodies of which side faces are put in a state where a jointing material is interposed therebetween are applied with pressure in the direction to which the ceramic structured bodies come close to one another, to remove the jointing material which has been extruded from the end face of a integrated body of the plural ceramic structured bodies, the jointing material remaining near the end faces of the integrated body can be dried thereafter.

The contents of JP-A 2004-291270 are incorporated herein by reference in their entirety.

SUMMARY OF THE INVENTION

An end-face heating apparatus according to the present invention is an end-face heating apparatus comprising: a heating tool that is placed almost in parallel with an end face of a honeycomb aggregated body in which a plurality of pillar-shaped honeycomb fired bodies are integrated with one another by interposing a sealing material paste layer formed on the side face thereof; a heating tool translation device used for translating the heating tool toward the honeycomb aggregated body; and a holding jig that holds the honeycomb aggregated body.

In the end-face heating apparatus according to the present invention, desirably, comprising two of the heating tools, wherein the two heating tools are placed at either ends of the honeycomb aggregated body such that they are almost in parallel with each other.

Moreover, in the end-face heating apparatus according to the present invention, desirably, the parallelism with respect to the contact face of the heating tool which contacts the end face of the honeycomb aggregated body is set to about 0.1 mm or less.

An end-face drying method for a honeycomb aggregated body according to the present invention is a method for drying an end face of a honeycomb aggregated body, using an end-face heating apparatus for drying at least an end face neighborhood of a honeycomb aggregated body in which a plurality of pillar-shaped honeycomb fired bodies are integrated with one another by interposing a sealing material layer that is formed on the side face of the honeycomb fired body, the end-face heating apparatus provided with a heating tool, a heating tool translation device, and a holding jig; and comprising the steps of: holding the honeycomb aggregated body with the holding jig; translating the heating tool with the heating tool translation device thereafter; and pressing the heating tool against an end face of the honeycomb aggregated body to apply heat to the end face neighborhood of the honeycomb aggregated body so that the sealing material paste layer at the end face neighborhood is dried.

In the end-face drying method for a honeycomb aggregated body according to the present invention, desirably, the end-face heating apparatus comprises two of said heating tools, and by simultaneously pressing the heating tools against both of the end faces of the honeycomb aggregated body, the end face neighborhoods (near-fields) of both end faces of the honeycomb aggregated body are simultaneously heated so that the sealing material paste layers at the end face neighborhoods of both end faces are dried.

Moreover, in the end-face drying method for a honeycomb aggregated body according to the present invention, desirably, the parallelism with respect to the contact face of the heating tool which contacts the end face of the honeycomb aggregated body is set to about 0.1 mm or less.

Further, in the end-face drying method for a honeycomb aggregated body according to the present invention, desirably, the heating tool is pressed against the end face of the honeycomb aggregated body at a pressure of at least about 400 N and at most about 600 N, and the surface temperature of the heating tool is desirably about 200° C. or more, but less than about 400° C.

A method for manufacturing a honeycomb structured body according to the present invention is a method for manufacturing a honeycomb structured body, comprising: manufacturing a pillar-shaped honeycomb molded body through molding of a ceramic material, the honeycomb molded body having a structure in which a number of cells are placed in parallel with one another in the longitudinal direction with a partition wall therebetween; preparing a honeycomb fired body by firing the honeycomb molded body; manufacturing a honeycomb aggregated body by integrating a plurality of the honeycomb fired bodies with one another by interposing a sealing material paste layer that is formed on the side face of the honeycomb fired body thereafter; carrying out an end-face drying to dry at least an end face neighborhood of the honeycomb aggregated body by an end-face heating apparatus; and further drying the entire sealing material paste layer on the side face of the honeycomb fired body, wherein the end-face heating apparatus comprises a heating tool, a heating tool translation device and a holding jig, and the end-face drying comprises: holding the honeycomb aggregated body with the holding jig; translating the heating tool with the heating tool translation device thereafter; and pressing the heating tool against an end face of the honeycomb aggregated body to apply heat to the end face neighborhood of the honeycomb aggregated body so that the sealing material paste layer at the end face neighborhood is dried.

In the method for manufacturing a honeycomb structured body according to the present invention, desirably, the end-face heating apparatus comprises two of the heating tools, and in the end-face drying, the end face neighborhoods of both end faces of the honeycomb aggregated body are simultaneously heated by simultaneously pressing said two heating tools against both of the end faces of the honeycomb aggregated body so that the sealing material paste layers at the end face neighborhoods of both end faces are dried.

Moreover, in the method for manufacturing a honeycomb structured body according to the present invention, desirably, the parallelism with respect to the contact face of the heating tool which contacts the end face of the honeycomb aggregated body is set to about 0.1 mm or less.

In the method for manufacturing a honeycomb structured body according to the present invention, desirably, the heating tool is pressed against the end face of the honeycomb aggregated body at a pressure of at least about 400 N and at most about 600N, and the surface temperature of the heating tool is desirably about 200° C. or more, but less than about 400° C.

DESCRIPTION OF THE EMBODIMENTS

Figure 1:
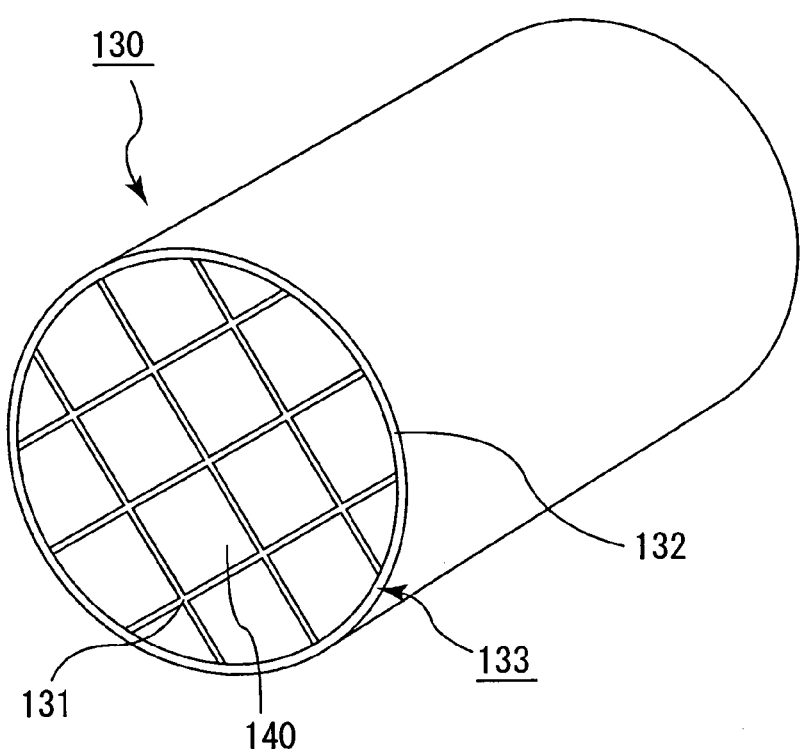
FIG. 1 is a perspective view that schematically shows one example of a ceramic filter.

First, referring to the drawings, the following description will discuss an end-face heating apparatus according to the embodiments of the present invention, and a method for drying an end-face of a honeycomb aggregated body according to the embodiments of the present invention.

An end-face heating apparatus according to the embodiments of the present invention is an end-face heating apparatus comprising: a heating tool that is placed almost in parallel with an end face of a honeycomb aggregated body in which a plurality of pillar-shaped honeycomb fired bodies are integrated with one another by interposing a sealing material paste layer formed on the side face thereof; a heating tool translation device used for translating the heating tool toward the honeycomb aggregated body; and a holding jig that holds the honeycomb aggregated body.

In the present specification, the shape indicated by the word "pillar" refers to any desired shape of a pillar including a round pillar, an oval pillar, a polygonal pillar and the like.

An end-face drying method for a honeycomb aggregated body according to the embodiments of the present invention is a method for drying an end face of a honeycomb aggregated body, using an end-face heating apparatus for drying at least an end face neighborhood of a honeycomb aggregated body in which a plurality of pillar-shaped honeycomb fired bodies are integrated with one another by interposing a sealing material layer that is formed on the side face of the honeycomb fired body, the end-face heating apparatus provided with a heating tool, a heating tool translation device, and a holding jig; and comprising the steps of: holding the honeycomb aggregated body with the holding jig; translating the heating tool with the heating tool translation device thereafter; and pressing the heating tool against an end face of the honeycomb aggregated body to apply heat to the end face neighborhood of the honeycomb aggregated body so that the sealing material paste layer at the end face neighborhood is dried.

It may become possible to suitably carry out the above-mentioned method for drying an end face of a honeycomb aggregated body according to the above-mentioned embodiments by using the end-face heating apparatus according to the above-mentioned embodiments.

The object to be heated by the end-face heating apparatus according to the embodiments of the present invention is the end face and the neighborhood (near-field) (hereinafter, both in combination are referred to also as a "an end face neighborhood") of the honeycomb aggregated body. The honeycomb aggregated body has a configuration in which plural pillar-shaped honeycomb fired bodies are integrated with one another by interposing a sealing material paste layer between the side faces of the honeycomb fired bodies. Specifically, examples of such a honeycomb aggregated body include the honeycomb aggregated body described in the background art of the present specification.

Further, in the present specification, the end face neighborhood of the honeycomb aggregated body refers to the region within about 3 cm from the end face of the honeycomb aggregated body.

Figure 3A:
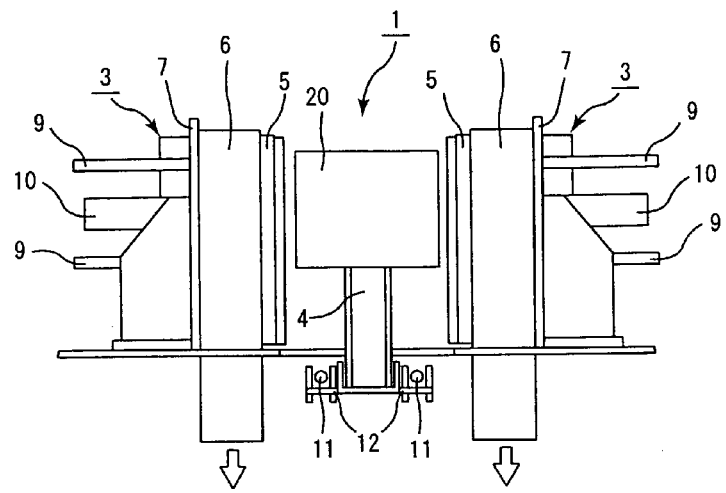
FIGS. 3A to 3C are explanatory views that schematically show a process in which the end faces of a honeycomb aggregated body are heated by using an end-face heating apparatus according to one embodiment of the present invention.
Figure 3B:
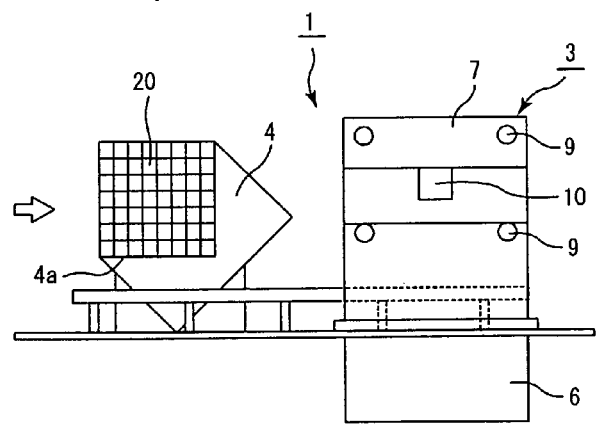
Figure 3C:
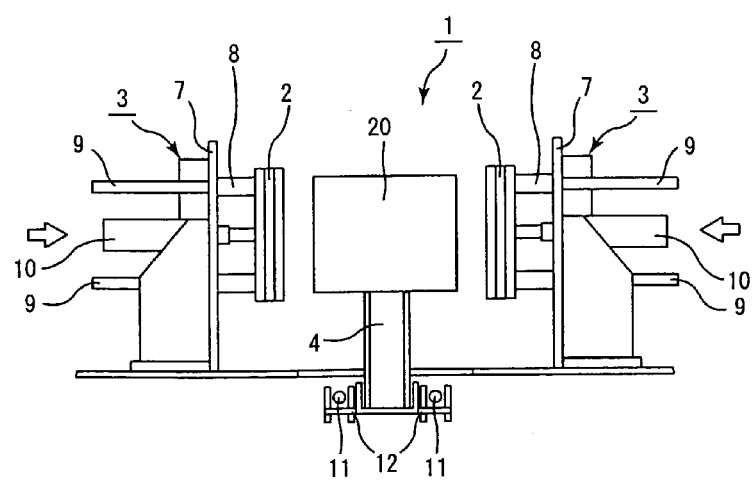

FIGS. 3A to 3C are explanatory views that schematically show a process in which the end faces of a honeycomb aggregated body 20 are heated by using an end-face heating apparatus according to one embodiment of the present invention. In the following description, first, a process in which the end face of the honeycomb aggregated body is heated by using the end-face heating apparatus according to one embodiment of the present invention is schematically explained briefly, and the end-face heating apparatus according to one embodiment of the present invention is then explained in detail. Here, FIG. 3B is a side view of FIG. 3A.

An end-face heating apparatus 1, shown in FIGS. 3A and 3B, is in a preparation stage (state in which the honeycomb aggregated body 20 is held by a holding jig 4) prior to the heating process of the end face of the honeycomb aggregated body 20. When the end-face heating apparatus 1 is in the preparation stage, a heating tool 2 is covered with a heat insulating plate 5 and a heat insulating plate attaching member 6 so as to prevent a temperature drop in the heating tool 2 (see FIG. 3C) and also ensure the safety of the working processes. Upon heating the end face by using the heating tool 2, first, as shown in FIG. 3B, the end-face heating apparatus 1 carries out translation of the holding jig 4, which holds the honeycomb aggregated body 20, to the position of the heating tool 2, and then the heat insulating plate 5 and the heat insulating plate attaching member 6 are lowered in a direction indicated by an arrow shown in FIG. 3A. Thus, the heating tool 2 is exposed as shown in FIG. 3C. Lastly, the end face of the honeycomb aggregated body 20 is heated by the heating tool 2 (see FIG. 3C).

The following description will discuss the end-face heating apparatus 1 in detail.

The end-face heating apparatus 1 of the present invention is provided with a heating tool 2, a heating tool translation device 3 and a holding jig 4 (see FIG. 3C).

As shown in FIG. 3A, in the end-face heating apparatus 1, a holding jig 4, which holds a honeycomb aggregated body 20, is placed in the center, and the lower portion of this holding jig 4 and a holding jig translating unit 12 located on the lower side of the floor are coupled to each other.

Wheels are attached to this holding jig translating unit 12 so that it is smoothly shifted along a holding jig translating shaft 11. By translating the holding jig translating unit 12 by a driving cylinder or the like (not shown), the holding jig 4, coupled to the holding jig translating unit 12, can be shifted as shown in FIG. 3B.

With respect to the configuration used for translating the holding jig 4, not limited to the above-mentioned structure, rails, which are designed so that the wheels attached to the holding jig translating unit 12 are just fitted thereto, may be used in place of the holding jig translating shaft 11; alternatively, another structure may be used in which, without using the wheels, the holding jig translating shaft 11 is inserted through a through hole formed in the holding jig translating unit 12 so that the holding jig translating unit 12 is shifted thereon.

Here, the holding jig 4 has a holding face 4a having an L shape as shown in FIG. 3B so as to hold the honeycomb aggregated body 20; however, the state of the holding face 4a is not particularly limited by this shape, and, for example, it may be designed to hold the honeycomb aggregated body 20 with the holding face inclined clockwise from the state as shown in FIG. 3B. Moreover, the shape of the holding face is not particularly limited by the L shape, and, for example, a shape formed by deleting one side of a rectangular shape may be used.

As shown in FIG. 3C, the heating tool 2, which is a heat-generating body having a flat-plate shape and vertically placed, is installed almost in parallel with the end face of the honeycomb aggregated body 20. Moreover, two of the heating tools 2 are placed almost in parallel with each other so as to be made face to face with each other.

Here, the heating tools 2 are designed so as to be shifted by the heating tool translation device 3.

Therefore, in the end-face heating apparatus 1, the heating tools 2 are placed almost in parallel with the end faces of the honeycomb aggregated body 20; that is, the two heating tools 2 are placed almost in parallel to the both ends of the honeycomb aggregated body 20 with each other.

Here, the arrangement in which the heating tools and the end faces of the honeycomb structured body are placed almost in parallel with each other refers to a state in which, when the heating tool is pressed against the end face of the honeycomb aggregated body at a pressure of about 500 N for example, no gap of 1 mm or more is present between the heating face of the heating tool and the end face of the honeycomb aggregated body.

Moreover, the arrangement in which the two heating tools are placed almost in parallel to the both ends of the honeycomb aggregated body with each other refers to a state in which, when the opposing heating faces are made close to each other so that the heating faces are made in contact with each other, no gap of 1 mm or more is present.

Here, the gap between the heating face and the end face of the honeycomb aggregated body, as well as the gap between the mutual heating faces, is determined based on whether or not a gap that allows a plate of 1 mm in thickness to be inserted therein is present.

As shown in FIGS. 3B and 3C, the heating tool translation device 3 is constituted by including a heating tool supporting plate 7 vertically placed, a heating tool supporting member 8 perpendicularly attached to the heating tool supporting plate 7 and a heating tool driving shaft 10 which can shift the heating tool 2.

The heating tool supporting plate 7 has through holes (not shown) formed therein corresponding to the positions of the heating tool supporting shafts 9, and cylinder-shaped (can-type) heating tool supporting members 8 are provided with so as to be fitted to the positions of these through holes. Thus, the heating tool supporting shafts 9 are inserted into the heating tool supporting member 8 as well as to the through holes. Moreover, the heating tool supporting shafts 9 are supported by the heating tool supporting member 8, and are allowed to slide smoothly inside the heating tool supporting member 8.

In this structure, the four corners of the heating tool 2 are secured to the heating tool supporting shaft 9 so that its main face is placed perpendicular to the heating tool supporting shaft 9 with its center connected to the heating tool driving shaft 10.

Therefore, the heating tool driving shaft 10, such as a cylinder connected to the heating tool 2, is operated as shown in FIG. 3C so that the heating tool 2 is freely shifted horizontally.

With respect to the structure of the heating tool translation device 3, not limited to the above-mentioned structure, any structure may be adopted as long as it allows the heating tool 2 to move horizontally while supporting vertically. For example, a structure in which the heating tool 2 is secured to the heating tool supporting plate 7 so that the heating tool supporting plate 7 is moved so as to translate the heating tool 2 horizontally may be employed. This structure is also included in the present invention.

With respect to the heating tool 2, not particularly limited, any tool may be used as long as its face to be pressed against the end face of a honeycomb aggregated body has an almost uniform temperature (normally, about 5° C. or less in in-plane temperature difference), and, for example, a tool which is pressed against the end face of the honeycomb aggregated body 20 with infrared rays or the like applied thereto may be used, or a tool which has a plate-shaped member having a built-in heat-generating element such as a heater may be used.

More specifically, for example, the heating tool 2 to be used in the present invention may have a structure in which a plurality of rod-shaped heaters are embedded; however, not limited to this structure, a structure in which a plurality of coil-shaped heaters are embedded, or a structure in which a plate-shaped heaters are embedded may be used.

The plate-shaped body forming the heating tool 2 is preferably made of a material that has a high thermal conductivity and is at least higher in hardness than the honeycomb aggregated body 20. Examples of the material forming the heating tool 2 include materials having a high thermal conductivity with high hardness, such as metal and a ceramic material.

The parallelism with respect to the contact face of the plate-shaped body of the heating tool 2 which contacts the end face of the honeycomb aggregated body 20 is desirably set to 0.1 mm or less.

In the case where the parallelism with respect to the contact face of the heating tool 2 is about 0.1 mm or less, upon pressing the heating tool 2 against the end face so as to heat the end face of the honeycomb aggregated body 20, contact portions and non-contact portions may not tend to occur between the heating tool 2 and the end face, making it easier to heat the end face evenly. Moreover, as will be described later, when the heating tool 2 is pressed against the end face at a predetermined pressure in the end-face drying method for a honeycomb aggregated body according to the embodiments of the present invention, the end face can be flattened more easily so as to be perpendicular to the longitudinal direction; however, if the above-mentioned parallelism is not satisfied, an end face that is not perpendicular to the longitudinal direction may be formed.

Incidentally, the parallelism is defined based upon JIS B 0621, and more specifically, when the contact face is sandwiched by two planes in parallel with the vertical plane, the parallelism is given as the gap between the two planes.

The contents of JIS B 0621 are incorporated herein by reference in its entirety.

Here, in the case where two heating jigs are placed face to face with each other, the sum of values of parallelism of the respective heating jigs is desirably set to about 0.2 mm or less.

Moreover, in addition to the above-mentioned members, the heating tool translation device 3 may include a thermometer for measuring the heating temperature of the heating tool 2, a temperature controlling device for controlling the heating temperature and a pressure meter for measuring the pressure to be applied on the heating tool 2, if necessary.

The end-face heating apparatus 1 of the present invention is designed in such a manner that, while holding the honeycomb aggregated body 20 by the holding jig 4, the heating tool 2 is pressed against the end face of the honeycomb aggregated body 20 by the heating tool translation device 3, and the end face of the honeycomb structured body 20 is heated through the following processes.

First, as shown in FIGS. 3A and 3B, the honeycomb aggregated body 20 is held by the holding jig 4. The holding jig translating unit 12 is moved in a direction indicated by an arrow in FIG. 3B by using a driving cylinder or the like. Since the holding jig 4 is coupled to the holding jig translating unit 12, the holding jig 4 is also shifted following the translation of the holding jig translating unit 12 so that the shift of the holding jig 4 enables the honeycomb aggregated body 20 to translate to a position making it possible to contact the heating tool 2.

Next, the heat insulating plate 5 and the heat insulating plate attaching member 6 are lowered from the end-face heating apparatus 1 in a heating preparation state, in a direction indicated by an arrow in FIG. 3A so that, as shown in FIG. 3C, the heating tool 2 is exposed.

Next, as shown in FIG. 3C, the heating tool driving shaft 10 is driven in the heating tool translation device 3 so as to translate the heating tool 2 to the end face of the honeycomb aggregated body 20 so that the heating tool 2 can be pressed against the end face of the honeycomb aggregated body 20. Thus, the sealing material paste layer at the end face neighborhood of the honeycomb aggregated body 20 is dried.

In this manner, by pressing the flat-plate-shaped heating tool 2 against the end face of the honeycomb aggregated body 20 and drying a portion closer to the end face first, it may become easier to effectively prevent a shrinkage (recessed portion) from occurring on the end face of the honeycomb aggregated body 20.

In the sequence of operations of the end-face heating apparatus 1 described above, (1) first, the honeycomb aggregated body 20 is held by the holding jig 4; (2) next, the end-face heating apparatus 1 translates the honeycomb aggregated body 20 to the position at which the honeycomb aggregated body 20 is made in contact with the heating tool 2; then, (3) the heat insulating plate 5 and the heat insulating plate attaching member 6 are lowered to expose the heating tool 2; and lastly, (4) the heating tool 2 is pressed against the end face of the honeycomb aggregated body 20.

However, the sequence of operations of the end-face heating apparatus 1 is not limited to the above-mentioned sequence of operations; and the following sequence may be employed in which: first, the heat insulating plate 5 and the heat insulating plate attaching member 6 are lowered to expose the heating tool 2 (the above-mentioned step (3)); next, the honeycomb aggregated body 20 is held by the holding jig 4 (the above-mentioned step (1)); then, the honeycomb aggregated body 20 is shifted to the position at which it is made in contact with the heating tool 2 (the above-mentioned step (2)); and lastly, the heating tool 2 is pressed against the end face of the honeycomb aggregated body 20 (the above-mentioned step (4)).

Moreover, in the end-face heating apparatus 1, a cylinder is used as the heating tool driving shaft 10 comprising the heating tool translation device 3; however, the kind of a cylinder is not particularly limited, and, for example, a pneumatic cylinder may be used, or a hydraulic cylinder may be used. Moreover, with respect to the driving mechanism, in addition to the cylinder, mechanisms, such as a gear mechanism and a screw mechanism, may be used.

As has been described above, the end-face heating apparatus of the present invention is desirably provided with two heating tools, and designed so as to simultaneously press the heating tools against both of the end faces of the honeycomb aggregated body.

In the case where the end-face heating apparatus comprises the two heating tools, and is designed so as to simultaneously press the heating tools against both of the end faces of the honeycomb aggregated body, since the sealing material paste layers at the end face neighborhoods of both end faces can be more easily dried concurrently; therefore, the drying time can be shortened more easily, and variations in the degree of drying in both of the end faces can be reduced more easily.

However, the end-face heating apparatus according to one embodiment of the present invention is not necessarily required to include two heating tools as shown in FIG. 3C, and may be provided with only one heating tool. More specifically, for example, one of the two heating tools shown in FIG. 3C may be replaced by a flat plate such as a simple pressing plate. In this case, it may become easier to efficiently dry the sealing material paste layer at one of the end face neighborhood of the honeycomb aggregated.

Moreover, the end-face heating apparatus according to the embodiments of the present invention is not necessarily required to be configured to simultaneously heat both of the end faces of the honeycomb aggregated body.

For example, even in the case of a configuration in which the heating tools are pressed against the end faces of a honeycomb aggregated body to heat one of the end faces one by one thereafter, it may become easier to efficiently dry the sealing material paste layers near the respective end.

Next, the method for drying an end face of a honeycomb aggregated body according to the embodiments of the present invention will be described.

As the end-face heating apparatus according to the embodiments of the present invention used for the method for drying an end face of a honeycomb aggregated body according to the embodiments of the present invention, the end-face heating apparatus according to the embodiments of the present invention, which has already been described above, can be suitably used. The configuration and operation sequences of the end-face heating apparatus have already been described; therefore, operation methods and drying conditions will mainly be described here.

In the end-face drying method for a honeycomb aggregated body according to the embodiments of the present invention, desirably, the end-face heating apparatus comprises two of the heating tools, and by simultaneously pressing the heating tools against both of the end faces of the honeycomb aggregated body, the end face neighborhoods of both end faces of the honeycomb aggregated body are simultaneously heated so that the sealing material paste layers at the end face neighborhoods of both end faces are dried.

In the method for drying an end face of a honeycomb aggregated body according to the embodiments of the present invention, the sealing material paste layers at the end face neighborhood of the respective end faces of the honeycomb aggregated body may be dried on one side at a time with one heating tool 2; however, by using two heating tools 2 and drying the sealing material paste layers at the end face neighborhoods of both end faces at the same time, the time required for drying both of the end faces can be shortened more easily, and in addition, it may become easier to accomplish the same drying state in the sealing material paste layers at the end face neighborhoods of both end faces.

In the method for drying an end face of a honeycomb structured body according to the embodiments of the present invention, desirably, the heating tool is pressed on the end face of the honeycomb aggregated body 20 at a pressure of at least about 400 N and at most about 600 N.

Figure 2A:
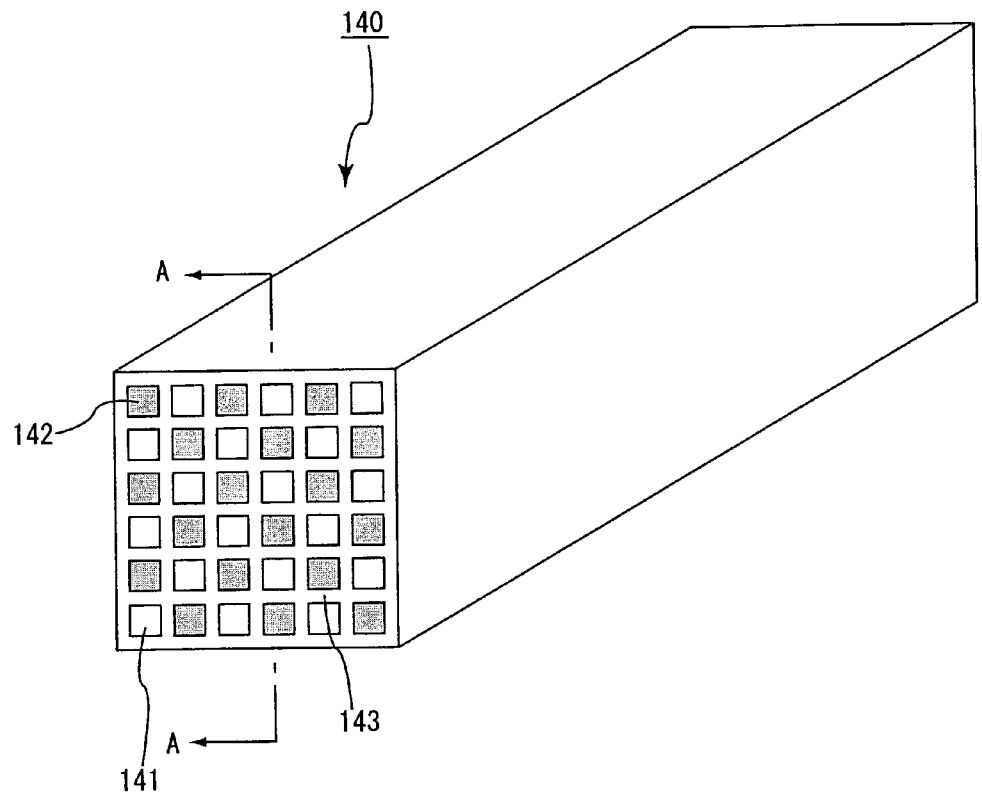
FIG. 2A is a perspective view that schematically shows a honeycomb fired body that constitutes the ceramic filter.
Figure 2B:
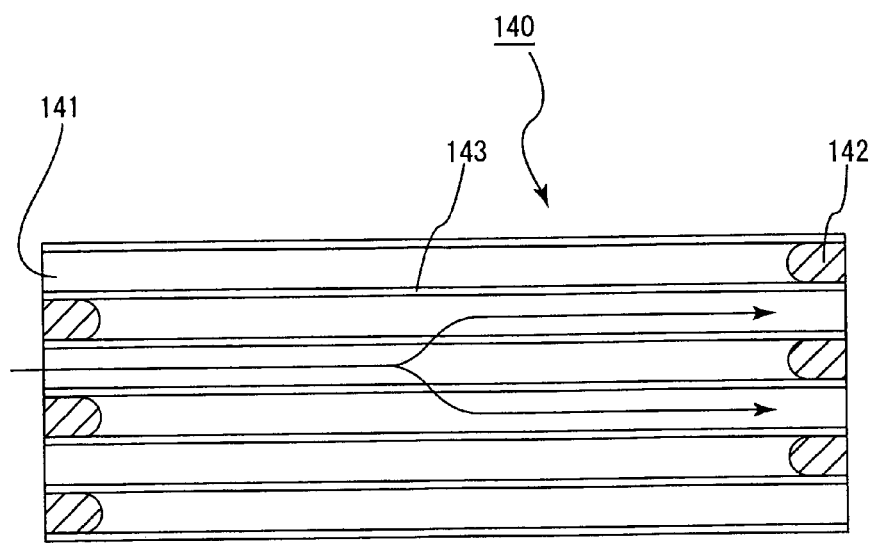
FIG. 2B is a cross-sectional view taken along line A-A of FIG. 2A.

In the method for drying an end face of a honeycomb structured body according to one embodiment of the present invention, as is described referring to FIGS. 1 and 2, the honeycomb aggregated body 20 has a configuration in which plural honeycomb fired bodies are integrated with one another by interposing a sealing material paste layer between the respective honeycomb fired bodies. Upon integrating the plural honeycomb fired bodies, their end faces are arranged such that the end faces are substantially in the same plane; however, there may be cases in which, in the longitudinal direction of the honeycomb aggregated body, the end face of one or a plurality of honeycomb fired bodies protrudes from or forms a recessed portion at the end face of the honeycomb aggregated body.

By pressing the heating tool 2 against the end face of the honeycomb aggregated body 20 at the above-mentioned pressure, the sealing material paste layer at the end face neighborhood can be dried and, at the same time, the protruded or recessed portion at the end face of the honeycomb fired bodies forming the honeycomb aggregated body 20 can be adjusted more easily so that the end faces of the honeycomb aggregated body can be flattened more easily.

Here, the pressure for pressing the heating tool 2 against the end face of about 400 N or more tends not to be insufficient for flattening the end face of the honeycomb aggregated body 20. In contrast, the above-mentioned pressure about 600 N or less is less likely to cause breakage of end faces of the honeycomb aggregated body 20.

The surface temperature of the heating tool 2 is desirably about 200° C. or more, but less than about 400° C.

The surface temperature of the heating tool of about 200° C. or more may more easily dry the sealing material paste layer on the end face neighborhood sufficiently. In contrast, the surface temperature of about 400° C. or more does not improve the drying efficiency so much, which thus may lead to an uneconomical end-face drying process. Moreover, if the drying temperature is set high, air foams may be generated in the formed sealing material layer to destroy the appearance of the product and to cause problems concerning reliability such as insufficient adhesive strength and generation of cracks or the like when the amount of air foams becomes too large. Therefore, the surface temperature of the heating tool 2 is desirably less than about 400° C.

Moreover, the heating time of the end face for pressing the heating tool 2 against the end face of the honeycomb aggregated body 20 is desirably at least about 20 seconds and at most about 60 seconds.

The heating time of about 20 seconds or more may more easily dry the sealing material paste layer at the end face neighborhood sufficiently. In contrast, the heating time exceeding about 60 seconds not only prevents the drying efficiency from improving efficiently, which leads to diseconomy, but also may cause adhesion between the end face of the honeycomb aggregated body 20 and the heating tool 2. Therefore, the heating time is desirably about 60 seconds or less.

In the method for drying an end face of a honeycomb aggregated body according to the embodiments of the present invention, the sealing material paste layer at the end face neighborhood is dried using the end-face drying apparatus according to the embodiments of the present invention. Thus, the shape of the end face portion is ensured, and a shrinkage (recessed portion) or the like may not easily occur. Further, it may become easier to efficiently flatten the end face of the honeycomb aggregated body.

Next, the method for manufacturing a honeycomb structured body according to the embodiments of the present invention will be described.

A method for manufacturing a honeycomb structured body according to the embodiments of the present invention is a method for manufacturing a honeycomb structured body, comprising: manufacturing a pillar-shaped honeycomb molded body through molding of a ceramic material, the honeycomb molded body having a structure in which a number of cells are placed in parallel with one another in the longitudinal direction with a partition wall therebetween; preparing a honeycomb fired body by firing the honeycomb molded body; manufacturing a honeycomb aggregated body by integrating a plurality of the honeycomb fired bodies with one another by interposing a sealing material paste layer that is formed on the side face of the honeycomb fired body thereafter; carrying out an end-face drying to dry at least an end face neighborhood of the honeycomb aggregated body by an end-face heating apparatus; and further drying the entire sealing material paste layer on the side face of the honeycomb fired body, wherein the end-face heating apparatus comprises a heating tool, a heating tool translation device and a holding jig, and the end-face drying comprises: holding the honeycomb aggregated body with the holding jig; translating the heating tool with the heating tool translation device thereafter; and pressing the heating tool against an end face of the honeycomb aggregated body to apply heat to the end face neighborhood of the honeycomb aggregated body so that the sealing material paste layer at the end face neighborhood is dried.

Hereinafter, the method for manufacturing a honeycomb structured body according to the embodiments of the present invention will be given in the order of processes.

Here, an example for manufacturing a honeycomb structured body whose constituent material is mainly composed of silicon carbide is raised to describe the method for manufacturing a honeycomb structured body in which silicon carbide powder which is a ceramic material is used.

Of course, the main component of the constituent material of the honeycomb structured body is not limited to silicon carbide, and examples of the ceramic material include nitride ceramics such as aluminum nitride, silicon nitride, boron nitride and titanium nitride; carbide ceramics such as zirconium carbide, titanium carbide, tantalum carbide and tungsten carbide; and oxide ceramics such as alumina, zirconia, cordierite, mullite, and aluminum titanate, and the like.

Among these, non-oxide ceramics are preferably used, and especially silicon carbide is preferable. Since they are superior in heat resistance and mechanical properties, and have a high thermal conductivity. Further, examples of the constituent material include ceramic materials such as silicon-containing ceramic prepared by blending the above-mentioned ceramics with metal silicon, or ceramic bound with silicon or a silicate compound, and among these, ceramic prepared by blending silicon carbide with metal silicon (silicon-containing silicon carbide) is desirably used.

First, a mixed powder is prepared by dry mixing an inorganic powder such as silicon carbide powder having different average particle diameters from each other as the ceramic material and an organic binder, and mixed liquid is prepared by mixing a liquid plasticizer, lubricant and water. Subsequently, the mixed powder and the mixed liquid are mixed with a wet mixer to prepare a wet mixture for manufacturing a molded body.

With respect to the particle diameter of the silicon carbide powder, although not particularly limited, those which are less susceptible to shrinkage in the succeeding firing process are desirably used, and for example, those powders, prepared by combining 100 parts by weight of powders having an average particle diameter of at least about 0.3 µm and at most about 50 µm with at least about 5 parts by weight and at most about 65 parts by weight of powders having an average particle diameter of at least about 0.1 µm and at most about 1.0 µm, are preferably used.

In order to adjust the values such as the pore diameter and the like of the honeycomb fired body, the firing temperature needs to be adjusted. Here, by adjusting the particle diameter of the inorganic powder, it may become possible to adjust the pore diameter to a predetermined range.

Examples of the above-mentioned organic binder include, although not particularly limited, methylcellulose, carboxy methylcellulose, hydroxyethyl cellulose, polyethylene glycol, and the like. Among these, methylcellulose is desirably used.

In general, the blending ratio of the above-mentioned binder is desirably set to at least about 1 parts by weight and at most about 10 parts by weight with respect to 100 parts by weight of the inorganic powder.

Examples of the plasticizer are not particularly limited and include, for example, glycine and the like.

Examples of the lubricant are not particularly limited and include, for example, polyoxyalkylene based compounds such as polyoxyethylene alkyl ether, polyoxypropylene alkyl ether and the like.

Specific examples of the lubricant include, for example, polyoxyethylene monobutyl ether, polyoxypropylene monobutyl ether and the like.

In addition, there is no necessity that the plasticizer and the lubricant are contained in the mixed material powder in some cases.

On the occasion of preparing the wet mixture, a dispersant solution may be used, and examples of the dispersant solution include an organic solvent such as benzene; alcohol such as methanol; water, and the like.

Moreover, a molding auxiliary may be added to the wet mixture.

Examples of the molding auxiliary include, although not particularly limited, ethylene glycol, dextrin, fatty acid, fatty acid soap, poly alcohol and the like.

Moreover, if necessary, a pore-forming agent such as balloons that are fine hollow spheres comprising oxide-based ceramics, such as spherical acrylic particles and graphite may be added to the above-mentioned wet mixture.

Examples of the above-mentioned balloons include, although not particularly limited, alumina balloons, glass micro-balloons, shirasu balloons, fly ash balloons (FA balloons), mullite balloons and the like. Among these, alumina balloons are more desirably used.

A wet mixture prepared here, in which silicon carbide powder is used, is desirably at a temperature of 28° C. or less. The reason for this is that when the temperature is too high, an organic binder may gel.

A proportion of organic component in the wet mixture is desirably about 10% by weight or less, and a content of water in the wet mixture is desirably at least about 8.0% by weight and at most about 20.0% by weight.

The above-mentioned wet mixture is transported after preparation thereof, and charged into an extrusion-molding machine.

After the wet mixture is sent into the extrusion-molding machine, a honeycomb molded body having a predetermined shape is formed through extrusion-molding.

Next, the above-mentioned honeycomb molded body is dried by using a drier such as a microwave drier, a hot-air drier, a dielectric drier, a reduced-pressure drier, a vacuum drier and a freeze drier so that a dried honeycomb molded body is formed.

Here, both ends of the manufactured honeycomb molded body are cut, applying a cutting process using a cutting machine, and the honeycomb molded body is cut into a predetermined length.

Thereafter, a predetermined amount of plug material paste, which forms plugs, is filled into the end portion at the outlet side of the inlet-side group of cells and the end portion at the inlet side of the outlet-side group of cells so that the cells are sealed. Upon sealing the cells, a sealing mask is applied to the end face (i.e. a cut face formed by the cutting process) of the honeycomb molded body so that the plug material paste is filled into only the cells which require sealing.

With respect to the plug material paste, although not particularly limited, such paste that sets the porosity of a plug manufactured through the subsequent processes at least about 30% and at most about 75% is desirably used, and for example, the same paste as the above-mentioned wet mixture may be used.

Filling of the plug material paste into the cells may be carried out according to need. In the case where the plug material paste is filled into the cells, for example, it may become possible to suitably use a honeycomb structured body obtained through the subsequent processes as a ceramic filter, whereas in the case where the plug material paste is not filled into the cells, for example, it may become possible to suitably use a honeycomb structured body obtained through the subsequent processes as a catalyst supporting carrier.

Next, the honeycomb molded body with the plug material paste filled therein is subjected to degreasing process (for example, at a temperature of at least about 200° C. and at most about 500° C.) and then to firing process (for example, at a temperature of at least about 1400° C. and at most about 2300° C.) under predetermined conditions so that a honeycomb fired body constituted by a single fired body as a whole, with a plurality of cells longitudinally placed in parallel with one another with a cell wall therebetween, having either of the end portions of the cells sealed, is manufactured (see FIG. 2).

Here, with respect to the degreasing and firing conditions of the honeycomb molded body, it is possible to apply conditions that have been conventionally used for manufacturing a filter made of porous ceramics.

Next, a sealing material paste to form the sealing material layer (adhesive layer) is applied to each of the side faces of the honeycomb fired body with an even thickness to form a sealing material paste layer, and by repeating a process for successively piling up other honeycomb fired bodies on this sealing material paste layer, a honeycomb aggregated body in which plural honeycomb fired bodies are integrated is manufactured.

Examples of the material used for forming the sealing material paste include, a material made from inorganic fibers and/or inorganic particles in addition to an inorganic binder and an organic binder, and the like.

Examples of the material for the above-mentioned inorganic binder include silica sol, alumina sol and the like. Each of these materials may be used alone, or two or more kinds of these may be used in combination. Of the above-mentioned inorganic binders, silica sol is more desirably used.

Examples of the organic binder include polyvinyl alcohol, methyl cellulose, ethyl cellulose, carboxymethyl cellulose and the like. Each of these may be used alone or two or more kinds of these may be used in combination. Among the organic binders, carboxymethyl cellulose is more desirably used.

Examples of the inorganic fibers include ceramic fiber such as silica-alumina, mullite, alumina, silica and the like. Each of these may be used alone, or two or more kinds of these may be used in combination. Among the inorganic fibers, alumina fibers are more desirably used.

Examples of the inorganic particles include carbides, nitrides and the like, more specifically, inorganic powder, made from silicon carbide, silicon nitride, boron nitride and the like. Each of these may be used alone, or two or more kinds of these may be used in combination. Among the above-mentioned inorganic particles, silicon carbide, which is superior in thermal conductivity, is more desirably used.

Moreover, a pore-forming agent such as balloons that are fine hollow spheres comprising oxide-based ceramics, spherical acrylic particles and graphite may be added to the above-mentioned sealing material paste, if necessary.

Examples of the above-mentioned balloons include, although not particularly limited, alumina balloons, glass micro-balloons, shirasu balloons, fly ash balloons (FA balloons), mullite balloons and the like. Among these, alumina balloons are more desirably used.

In order to integrate the honeycomb fired bodies, the above-mentioned process in which a sealing material paste layer is formed on each of the side faces of the honeycomb fired body and the honeycomb fired bodies are successively piled up may be applied, or a process in which the honeycomb fired bodies are assembled by interposing a spacer or the like therebetween and a sealing material paste is injected between the spaces formed by the spacers to form a sealing material paste layer so that an integrated honeycomb aggregated body is formed, may be applied.

The latter process for injecting the sealing material paste to form the sealing material paste layer so that the honeycomb fired bodies are integrated as the honeycomb aggregated body, will be described in detail.

Figure 4A:
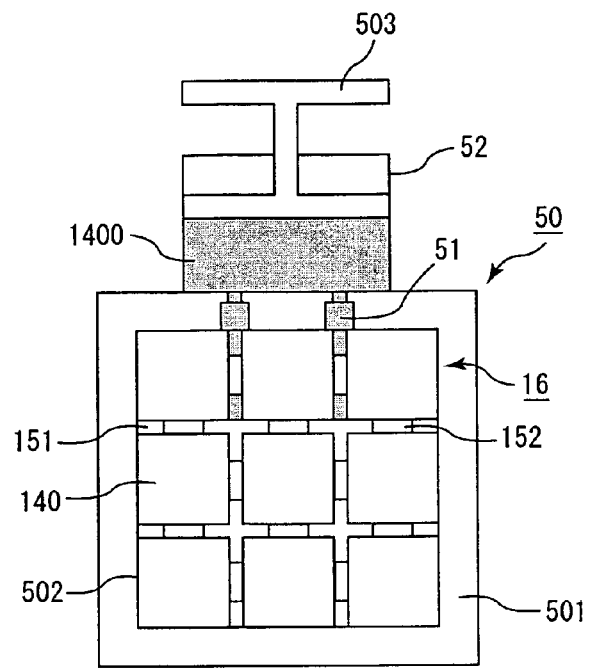
FIGS. 4A and 4B are cross-sectional views which illustrate the sealing material paste injection device provided with a cylindrical (can-type) jig that is used upon filling of the sealing material paste between the honeycomb fired bodies.
Figure 4B:
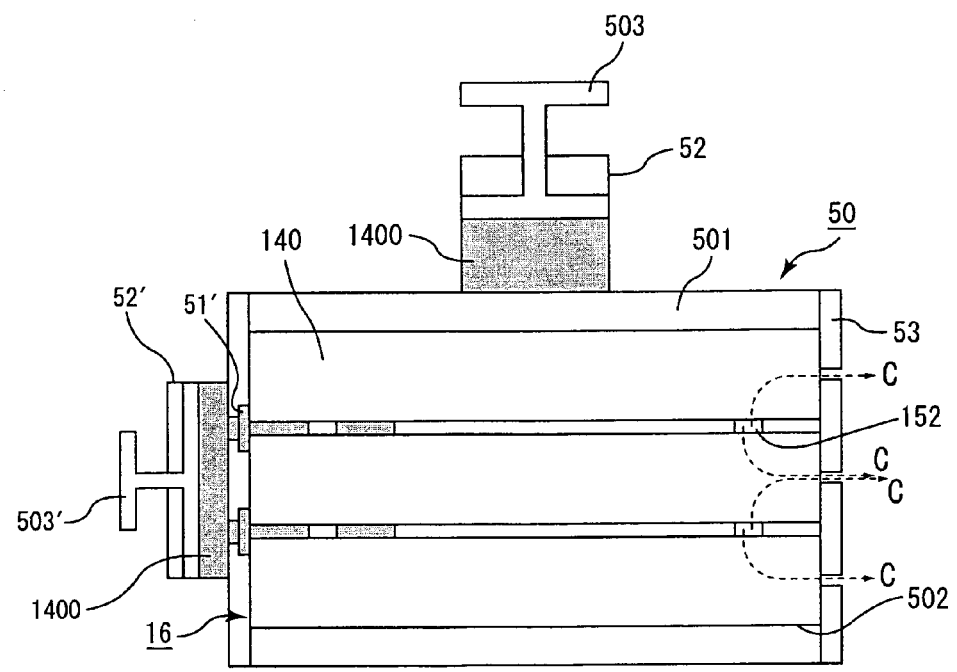

More specifically, for example, a sealing material paste injection device provided with a cylindrical (can-type) jig as shown in FIGS. 4A and 4B may be used to fill the sealing material paste between the honeycomb fired bodies.

FIGS. 4A and 4B are cross-sectional views which illustrate the sealing material paste injection device provided with a cylindrical (can-type) jig that is used upon filling of the sealing material paste between the honeycomb fired bodies. FIG. 4A shows a cross-section perpendicular to the longitudinal direction of the injection device, wherein the honeycomb fired bodies are assembled inside the injection device with a spacer interposed therebetween (hereinafter, such an assembly of honeycomb fired bodies is referred to as a "piled-up body of honeycomb fired bodies"). FIG. 4B shows a cross-section parallel to the longitudinal direction of the injection device, wherein the piled-up body of honeycomb fired bodies is set inside the injection device.

A sealing material paste injection device 50 is provided with a cylindrical (can-type) body 501 having an interior space 502 in which a piled-up body 16 of honeycomb fired bodies is housed. Paste supplying chambers 52, 52' are attached to the outer side face and the outside of one of the end portions of this cylindrical (can-type) body 501, respectively. Openings 51, 51', which allow the supplying chamber 52, 52' to communicate with the interior space, are formed in the cylindrical (can-type) body 501, and sealing material paste 1400 is supplied simultaneously from both of the side faces and the one end portion via these openings 51, 51' (hereinafter, described more specifically as a supplying hole or a supplying groove). Extruding mechanisms 503, 503' used for extruding the sealing material paste 1400 is attached to the supplying chambers 52, 52', respectively. Opening- and closing type bottom plates 53 are attached to the end portion of the sealing material paste injection device 50, on the side opposite to the side to which the supplying chamber 52' is attached. When the bottom plates 53 are closed to seal a cavity 151 formed between the honeycomb fired bodies 140 comprising the piled-up body 16 of honeycomb fired bodies, it may become easier to prevent the sealing material paste 1400 from adhering to the end face of the piled-up body 16 of honeycomb fired bodies. Incidentally, numeral 152 represents a spacer.

With respect to the material of the bottom plates 53, a material which is superior in air permeability or a material having air holes as shown in FIGS. 4A and 4B, which is superior in air tightness, is used. The reason for this is because, upon injecting the sealing material paste 1400 into the sealing material paste injection device 50 at the time of the filling process of the sealing material paste, the gas which is present inside the sealing material paste injection device 50 flows out through the end face of this injection device 50.

In the case where the material having air holes which is superior in air tightness is used, the gas inside the injection device 50 passes through the partition wall of the honeycomb fired body 140 in the direction of arrow C. and further through the air holes of the bottom plates 53, thereby flowing out from the injection device 50.

The configuration of the injection device 50 is not particularly limited as long as it is a cylindrical (can-type) body with the paste supplying chambers 52, 52' placed independently on the outer periphery and on one of the end portions of the injection device 50. Here, the respective supplying chambers 52, 52' have an inner chamber which is allowed to communicate with the inner periphery of the injection device 50 through the supplying hole (or the supplying groove) 51. The injection device 50 further has a structure in which the piled-up body 16 of honeycomb fired bodies can be placed on the inner periphery of the injection device 50, or a structure in which the piled-up body 16 of honeycomb fired bodies can be assembled inside the inner periphery. Examples of such injection devices may include, for example, an assembling-type jig that can be disassembled, or an integral jig, and the size and/or shape of the inner periphery of the injection device 50 may be in a predetermined size and/or shape, or the size and/or shape thereof may be changeable by the narrowing of the inner peripheral face which enables the piled-up body 16 of honeycomb fired bodies to be bound tightly. Moreover, the injection device 50 may be an assembling jig in which the paste supplying chambers 52, 52' can be detached.

In the case where the injection device 50 is an assembling-type jig that can be disassembled, or a jig in which the size and/or shape of the inner periphery is changeable, a manufacturing process of the piled-up body 16 of honeycomb fired bodies in which plural honeycomb fired bodies 140 are assembled can be carried out at the inner periphery of the injection device 50. Of course, the piled-up body 16 of honeycomb fired bodies may be set in the inner periphery of the injection device 50 after it is manufactured as the piled-up body.

The configuration of the paste supplying chambers 52, 52' is not particularly limited as long as it is a container, placed on the outer periphery of the injection device 50, allows the sealing material paste 1400 to be charged into the inner chamber, and can pressurize the paste charged therein.

The shape, size and number of the supplying holes 51, 51' are not particularly limited, but it is necessary for the position thereof to be at a position corresponding to the cavity 151 formed between the honeycomb fired bodies 140 constituting the piled-up body 16 of honeycomb fired bodies, and it is desirable for the supplying holes 51 to be formed with a uniform space so that the sealing material paste 1400 can be filled into the cavity 151 completely. Here, to fill in the paste uniformly, it is more desirable for the supplying holes to be formed as supplying grooves.

The pressure to be applied upon press-injecting the sealing material paste 1400 into the injection device 50 is appropriately adjusted depending on the amount and viscosity of the sealing material paste 1400 to be press-injected, and on the size, positions and number and the like of the supplying holes, and according to need, suction processes may be carried out in combination therewith on the end face at the side opposite to the side to which the supplying chamber 52' of the injection device 50 is attached.

The injection device 50 is used in the following manner.

As shown in FIGS. 4A and 4B, after the piled-up body 16 of honeycomb fired bodies has been assembled, it is housed in the sealing material paste injection device 50. Next, the sealing material paste 1400 is injected simultaneously using the paste supplying chambers 52, 52'. As an alternative manner, the piled-up body 16 of honeycomb fired bodies may be assembled inside the sealing material paste injection device 50, and the sealing material paste 1400 may be injected thereafter, in such a manner that the sealing material paste 1400 is injected at the same time from the respective paste supplying chambers 52, 52'. Either of these methods may be used.

The sealing material paste injection device 50 shown in FIGS. 4A and 4B is provided with the paste supplying chambers 52, 52' which are independently attached to the outer side face and the outside of one of the end portions of the cylindrical (can-type) body 501, and is configured such that the sealing material paste is injected from the two of these paste supplying chambers 52, 52'. However, when the injection device is used for filling the sealing material paste into the space between the honeycomb fired bodies which form the piled-up body of honeycomb fired bodies, the sealing material paste may be injected from only either side of the outer side face or the outside of one of the end portions.

In the method for manufacturing a honeycomb structured body according to the embodiments of the present invention, the honeycomb aggregated body may be formed by such press-injection method of the sealing material paste as described above.

Next, in the method for manufacturing a honeycomb structured body according to the embodiments of the present invention, an end-face drying process is carried out. The honeycomb aggregated body thus manufactured through the above-mentioned processes is subjected to this end-face drying process for drying at least the end face neighborhood of the honeycomb aggregated body by using an end-face heating apparatus.

The end-face heating apparatus according to the embodiments of the present invention as described above may suitably be used as the above-mentioned end-face heating apparatus used in the above-mentioned end-face drying process. Moreover, the method for drying an end face of a honeycomb aggregated body according to the embodiments of the present invention may preferably be used as the method for drying an end face carried out in the end-face drying process. As for the end-face heating apparatus according to the embodiments of the present invention and the end-face drying method according to the embodiments of the present invention mentioned above, their configurations and effects are already described in detail. Thus, description thereof will be omitted here.

In the method for manufacturing a honeycomb structured body according to the embodiments of the present invention, desirably, the end-face heating apparatus according to the embodiments of the present invention has two of the heating tools, and in the end-face drying process, the end face neighborhoods of both end faces of the honeycomb aggregated body are simultaneously heated by simultaneously pressing the two heating tools against both of the end faces of the honeycomb aggregated body so that the sealing material paste layer at end face neighborhoods of both end faces are dried.

By simultaneously pressing the two heating tools against both of the end faces of the honeycomb aggregated body and drying the sealing material paste layer at the end face neighborhoods of both end faces, it may become possible to reduce the time required for drying both of the end faces more easily and to improve the efficiency of the whole manufacturing process more easily. Moreover, since the sealing material paste at end face neighborhoods of both end faces can be dried into the same dry condition more easily, the honeycomb structured body obtained through the subsequent processes is allowed to obtain stably predetermined functionalities more easily.

In the method for manufacturing a honeycomb structured body according to the embodiments of the present invention, desirably, the heating tool is pressed on the end face of the honeycomb aggregated body at a pressure of at least about 400 N and at most about 600 N.

As described in the method for drying an end face of a honeycomb aggregated body according to the embodiments of the present invention, when the heating tool is pressed against the end face of the honeycomb aggregated body at the above-mentioned pressure, the end face of the honeycomb aggregated body can be flattened more easily. Therefore, it may become easier to efficiently manufacture a honeycomb structured body as a product having predetermined appearance and functionalities.

In the method for manufacturing a honeycomb structured body according to the embodiments of the present invention, after the sealing material paste layer at the end face neighborhood is dried through the above-mentioned end-face drying process, the honeycomb aggregated body as well as the entire sealing material layer at the side face of the honeycomb fired body are further dried.

The method for drying the entire sealing material paste layer is not particularly limited, and examples thereof include a microwave drying method, a hot-air drying method, a dielectric drying method, a reduced-pressure drying method, a vacuum drying method and a freeze drying method.

Moreover, the condition for drying the entire sealing material paste layer is not particularly limited, and for example, when the hot-air drying method is applied for the drying method, drying is carried out under a condition of the hot-air temperature of at least about 100° C. and at most 200° C., and the drying time of at least about 30 minutes and at most about 60 minutes. Under such a drying condition, it may become possible to dry the entire sealing material paste layer sufficiently.

In the method for manufacturing a honeycomb structured body according to the embodiments of the present invention, regardless of which drying method is used for drying the entire sealing material paste layer, the recessed portion can be prevented more easily from occurring on the end face upon drying the entire sealing material layer, since the sealing material paste layer of the end face neighborhood is preliminarily dried through the end-face drying method for a honeycomb aggregated body according to the embodiments of the present invention.

Next, the honeycomb aggregated body with the sealing material layer (adhesive layer) formed through drying of the sealing material paste layer as mentioned above, is subjected to a cutting process by using a diamond cutter and the like so that a ceramic block having a cylindrical shape is manufactured.

By forming a sealing material layer (coat layer) on the outer periphery of the ceramic block by using the sealing material paste, a honeycomb structured body in which the sealing material layer (coat layer) is formed on the peripheral portion of the cylindrical ceramic block which has a plurality of the honeycomb fired bodies combined with one another by interposing the sealing material layer (adhesive layer) is manufactured.

Thereafter, if necessary, a catalyst is supported on the honeycomb structured body. The supporting process of the catalyst may be carried out on the honeycomb fired body prior to the manufacturing of the aggregated body.

In a case where the catalyst is supported on the honeycomb structured body, an alumina film having a large specific surface area is desirably formed on the surface of the honeycomb structured body, and a co-catalyst and catalyst such as platinum is desirably adhered to the surface of the alumina film.

With respect to the method for forming the alumina film on the surface of the honeycomb structured body, for example, a method in which the honeycomb structured body is impregnated with a solution of a metal compound containing aluminum such as $Al(NO_3)_3$ and then heated and a method in which the honeycomb structured body is impregnated with a solution containing alumina powder and then heated are proposed.

With respect to the method for adhering the co-catalyst to the alumina film, for example, a method in which the honeycomb structured body is impregnated with a solution of a metal compound containing a rare earth element such as $Ce(NO_3)_3$ and then heated is proposed.

With respect to the method for adhering the catalyst to the alumina film, for example, a method in which the honeycomb structured body is impregnated with, for example, a nitric acid solution of diammine dinitro platinum ($[Pt(NH_3)_2(NO_2)_2]$ $HNO_3$, platinum concentration: about 4.53% by weight) and then heated is proposed.

Moreover, the catalyst may also be adhered to the honeycomb structured body through a method in which the honeycomb structured body is impregnated with a solution containing alumina powder, and then heated. The alumina powder is constituted by alumina particles which have catalyst preliminarily adhered thereto.

The method for manufacturing a honeycomb structured body according to the embodiments of the present invention as described above allows a honeycomb structured body to be manufactured with a high working efficiency.

Moreover, in the case where the honeycomb structured body is manufactured through the method mentioned above, since the end face of the honeycomb aggregated body is dried through the end-face drying method for a honeycomb aggregated body according to the above-mentioned embodiment, a honeycomb aggregated body with a well-aligned end face can be manufactured more easily. Thus, the functions and appearance of the honeycomb structured body to be manufactured through the subsequent processes can be maintained more easily. Moreover, damages and the like which occur in the cell walls upon housing the honeycomb structured body in a casing can be more easily prevented from occurring since the honeycomb structured body has a flattened surface. Consequently, the efficiency of the whole manufacturing process of the honeycomb structured body can be more easily improved by applying the present invention.

In the case where the sealing material paste layer is dried by the end-face heating apparatus according to the embodiments of the present invention, since it may become easier to dry the entire end face at a specific temperature for a specific length of time in a uniform manner, the problems caused by different drying conditions between regions within the same end face, such as too much drying of the sealing material paste layer at only a certain area or a state in which a certain area remains undried, become less likely to occur, and thus a shrinkage (recessed portion) of the sealing material paste layer due to those problems tends not to occur. The honeycomb structured body with such a shrinkage (recessed portion) in the sealing material paste layer lacks the required functions and appearance as an end product, but such a honeycomb structured body can be prevented from being manufactured.

Moreover, when there is a misalignment in the adhesive positions of the honeycomb fired bodies, a process for adjusting the misalignment needs to be carried out separately, and with respect to an end-face heating apparatus according to the embodiments of the present invention, the process for adjusting the misalignment can be omitted more easily.

In the end-face heating apparatus according to the embodiments of the present invention, since a heating tool is pressed against an end face of a honeycomb aggregated body, it may become easier to dry only the sealing material paste layer at the end face neighborhood efficiently and uniformly so that a shrinkage (recessed portion) that is caused in the sealing material paste layer after a sealing material layer has been formed can be made very small more easily.

Moreover, in the case where an end-face heating apparatus provided with two heating tools according to the embodiments of the present invention is used, since the heating tools can be simultaneously pressed against both of the end faces of the honeycomb aggregated body so that the sealing material paste layers at the end face neighborhoods of both end faces may be more easily dried concurrently; therefore, the drying time can be shortened more easily, and the degree of drying in both of the end faces may be more easily maintained homogeneously.

In the method for drying an end face of the honeycomb aggregated body according to the embodiments of the present invention, since the sealing material paste layer at the end face neighborhood of the honeycomb aggregated body is dried by using the end-face heating apparatus according to the embodiments of the present invention, it may become easier to efficiently manufacture a honeycomb structured body or the like having a predetermined end-face state.

Moreover, in the honeycomb aggregated body constituted by integrating a plurality of honeycomb fired bodies, the positions of the respective honeycomb fired bodies in the longitudinal direction tend to deviate, failing to provide a well-aligned end face. Even in such a case, in the method for drying an end face of a honeycomb aggregated body according to the embodiments of the present invention, by pressing the heating tool against the end face of the honeycomb aggregated body at a predetermined pressure, the deviations of the honeycomb fired bodies in the longitudinal direction can be corrected more easily so that, while drying the sealing material paste layer at the end face neighborhood, the end face of the honeycomb aggregated body can be more easily made into a well-aligned state (flattened).

In the method for manufacturing a honeycomb structured body according to the embodiments of the present invention, since the end face of the honeycomb aggregated body according to the embodiments of the present invention is dried by using the above-mentioned method for drying an end face of a honeycomb aggregated body so that a honeycomb aggregated body with a well-aligned end face can be manufactured more easily; therefore, it may become easier not only to ensure the functions and appearance of a honeycomb structured body to be manufactured through the post processes, but also to effectively prevent damages and the like occurring in the cell walls, upon housing the honeycomb structured body in a casing.

Now, the honeycomb structured body described here is described as a honeycomb structured body which is mainly used as a honeycomb filter (ceramic filter) for capturing particulates contained in the exhaust gases. However, the honeycomb structured body described throughout this specification may also preferably be used as a catalyst supporting carrier (honeycomb catalyst) that converts exhaust gases.

EXAMPLES

The following description will discuss the present invention in detail by means of examples; however, the present invention is not intended to be limited by these examples.

Example 1

Powder of α-type silicon carbide having an average particle diameter of 10 μm (250 kg), powder of α-type silicon carbide having an average particle diameter of 0.5 μm (100 kg) and an organic binder (methylcellulose) (20 kg) were mixed to prepare mixed powder.

Next, separately, a lubricant (UNILUBE, made by NOF Corp.) (12 kg), a plasticizer (glycerin) (5 kg) and water (65 kg) were mixed to prepare a liquid mixture, and this liquid mixture and the mixed powder were mixed by using a wet-type mixing machine so that a wet mixture was prepared.

The moisture content of the wet mixture thus prepared was 14% by weight.

Next, this wet mixture was transported to an extrusion molding machine by using a transporting device, and charged into a material charging port of the extrusion molding machine.

Here, the moisture content of the wet mixture immediately before the charging into the extrusion molding machine was 13.5% by weight.

The wet mixture was then extrusion-molded into a molded body having a shape shown in FIG. 2.

Next, after the raw molded body had been dried by using a microwave drier or the like, a sealing material paste having the same composition as above-mentioned the wet mixture was filled into predetermined cells.

After having been again dried by using a drier, the resulting honeycomb molded body was degreased at 400° C., and then fired at 2200° C. in a normal-pressure argon atmosphere for 3 hours so that a honeycomb fired body made of a silicon carbide sintered body, which had a porosity of 40%, an average pore diameter of 12.5 μm, a size of 34.3 mm×34.3 mm×150 mm, the number of cells (cell density) of 46.5/cm$^2$ and a thickness of each cell wall of 0.20 mm, was manufactured.

By using a heat resistant sealing material paste containing 30% by weight of alumina fibers having an average fiber length of 20 μm, 21% by weight of silicon carbide particles having an average particle diameter of 0.6 μm, 15% by weight of silica sol, 5.6% by weight of carboxymethyl cellulose and 28.4% by weight of water, a plurality of honeycomb fired bodies were integrated with one another to manufacture a honeycomb aggregated body.

The end faces of the honeycomb aggregated body thus manufactured were dried by using an end-face heating apparatus shown in FIG. 3.

More specifically, the manufactured honeycomb aggregated body was held by a holding jig 4 and shifted to a position which allowed making contact with heating tools 2, and the heating tools 2 were pressed against the end faces of the honeycomb aggregated body so that the sealing material paste layers at the end face neighborhoods of both end faces were dried.

At this time, the surface temperature of each heating tool 2 was 300° C., the heating time was 40 seconds and the pressing pressure was 500 N.

Moreover, with respect to the end-face heating apparatus used in the present process, the parallelism of each heating tool was 0.05 mm.

Next, the honeycomb aggregated body in which the sealing material paste layers at the end face neighborhoods of both end faces had been dried was charged into a hot-air dryer where it was dried under conditions of 180° C. at the highest temperature for 40 minutes so that the entire sealing material paste layers on the side faces of the honeycomb fired body were dried; thus, a honeycomb aggregated body on which sealing material layers (adhesive layers) had been formed was manufactured.

Examples 2 and 3, Reference Examples 1 to 11

The same processes as those of Example 1 were carried out except that the drying process conditions of the heating tools were changed to those shown in Tables 1-1 and 1-2 to manufacture a honeycomb aggregated body on which sealing material layers had been formed.

Comparative Example 1

The same processes as those of Example 1 were carried out except that a hot-air drying process was used to dry the sealing material paste layers at the end face neighborhoods of both end faces of the honeycomb aggregated body without using the end-face heating apparatus and that with respect to the drying conditions, a hot air flow of 5 m/s at 180° C. was applied for 40 seconds so that a honeycomb aggregated body was manufactured.

(Observation of End Face State of Honeycomb Aggregated Body)

With respect to the honeycomb aggregated body manufactured through the above-mentioned sequence of processes, the state of a shrinkage (recessed portion) of the sealing material layer was observed, and the size of the shrinkage (recessed portion) was measured by inserting a rod-shaped member having a diameter of 0.5 mm with scales being notched on its side face into the shrinkage (recessed portion). Here, with respect to the honeycomb aggregated body manufactured in Reference Example 10, the sealing material layer was raised from the end face of the honeycomb structured body, and the height of the raised portion (convex portion) was measured by putting the rod-shaped member next to the raised portion (convex portion).

The results are shown in Tables 1-1 and 1-2.

Figure 5A:
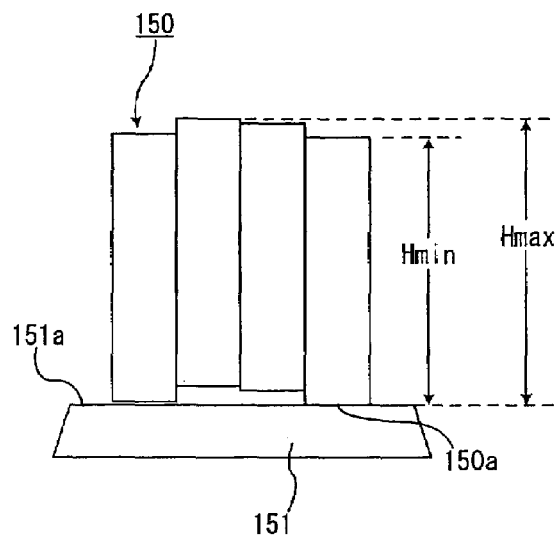
FIG. 5A is an explanatory drawing that illustrates the method for calculating the parallelism of each honeycomb aggregated body.

(Parallelism of End Faces of Honeycomb Aggregated Body/ See FIG. 5A)

As shown in FIG. 5A, a honeycomb aggregated body 150 was placed on a mount base 150 having a flat mount face 151a on its upper face such that one of the end faces 150a of honeycomb aggregated body 150 contacted amount base 151a, and the distances of the respective end faces at the other side of the respective honeycomb fired bodies comprising the honeycomb aggregated body 150 from the mount face were measured, and a difference between the maximum value Hmax and the minimum value Hmin was calculated as the parallelism of the honeycomb aggregated body.

The results are shown in Tables 1-1 and 1-2.

Figure 5B:
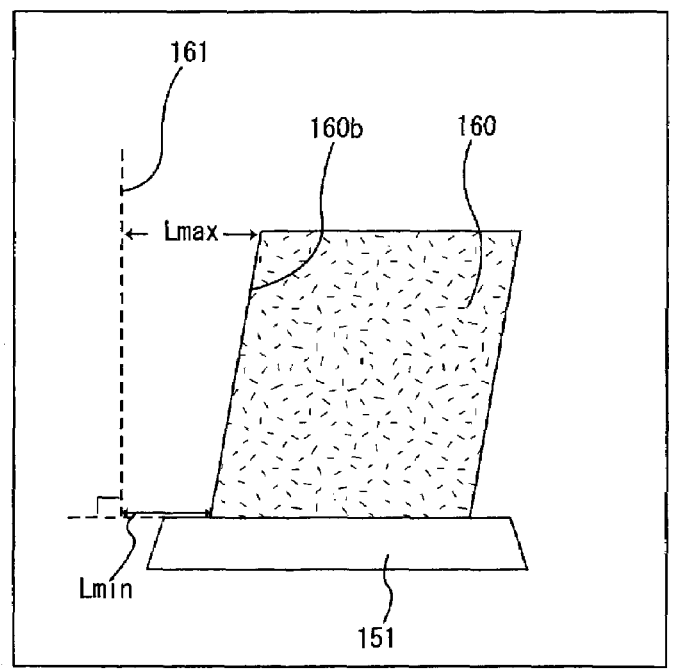
FIG. 5B is an explanatory drawing that illustrates the method for calculating the squareness of each honeycomb aggregated body.

(Squareness of Honeycomb Aggregated Body/See FIG. 5b)

In a state where a honeycomb aggregated body was mounted on the mount base 151, imaging of its side face was taken up to obtain a side face image 160. Next, a hypothetical line 161 perpendicular to the mount face was drawn on the outside of this side face image 160, and the maximum value Lmax and the minimum value Lmin of the distances between the hypothetical line 161 and the outer edges 160b of the side face images were measured so that the difference thereof was calculated as the squareness.

Here, with respect to the side face images, three images were taken by rotating the honeycomb aggregated body by every 120° on the mount face, and the squareness was calculated on each of the three images so that the average value was defined as the squareness of the honeycomb aggregated body.

The results are shown in Tables 1-1 and 1-2.

Here, the respective FIGS. 5A and 5B are explanatory drawings that illustrate methods for calculating the parallelism and squareness of each honeycomb aggregated body.

TABLE 1-1

|  | Heating temperature (° C.) | Heating time (s) | Pressure (N) | Wind velocity (m/s) | Parallelism of heating tool (mm) | Gap between heating tool and end face of honeycomb aggregated body (mm) | Gap between heating tools (mm) |
|---|---|---|---|---|---|---|---|
| Example 1 | 300 | 40 | 500 |  | 0.05/0.05 | 0.15/0.15 | 0.1 |
| Example 2 | 300 | 30 | 500 |  | 0.05/0.05 | 0.15/0.15 | 0.1 |
| Example 3 | 350 | 30 | 500 |  | 0.05/0.05 | 0.15/0.15 | 0.1 |
| Reference Example 1 | 300 | 20 | 500 |  | 0.05/0.05 | 0.15/0.15 | 0.1 |
| Reference Example 2 | 150 | 40 | 500 |  | 0.05/0.05 | 0.15/0.15 | 0.1 |
| Reference Example 3 | 400 | 30 | 500 |  | 0.05/0.05 | 0.15/0.15 | 0.1 |
| Reference Example 4 | 300 | 40 | 250 |  | 0.05/0.05 | 0.15/0.15 | 0.1 |
| Reference Example 5 | 300 | 40 | 500 |  | 0.15/0.15 | 0.25/0.25 | 0.3 |
| Reference Example 6 | 300 | 10 | 500 |  | 0.05/0.05 | 0.15/0.15 | 0.1 |
| Reference Example 8 | 450 | 30 | 500 |  | 0.05/0.05 | 0.15/0.15 | 0.1 |
| Reference Example 8 | 100 | 40 | 500 |  | 0.05/0.05 | 0.15/0.15 | 0.1 |
| Reference Example 9 | 300 | 40 | 200 |  | 0.05/0.05 | 0.15/0.15 | 0.1 |
| Reference Example 10 | 300 | 40 | 500 |  | 0.25/0.25 | 0.35/0.35 | 0.5 |
| Reference Example 11 | 300 | 40 | 650 |  | 0.05/0.05 | 0.15/0.15 | 0.1 |
| Comparative Example 1 | 180 | 40 |  | 5 |  |  |  |

TABLE 1-2

|  | Shrinkage of sealing material layer | Parallelism | Squareness | Damage in end face |
|---|---|---|---|---|
| Example 1 | Less than 1 mm | Less than 1 mm | Less than 1 mm | No |
| Example 2 | Less than 1 mm | Less than 1 mm | Less than 1 mm | No |
| Example 3 | Less than 1 mm | Less than 1 mm | Less than 1 mm | No |
| Reference Example 1 | 1 to 2 mm | Less than 1 mm | Less than 1 mm | No |
| Reference Example 2 | 1 to 2 mm | Less than 1 mm | Less than 1 mm | No |
| Reference Example 3 | Generation of foam | Less than 1 mm | Less than 1 mm | No |
| Reference Example 4 | Less than 1 mm | 1 to 2 mm | Less than 1 mm | No |
| Reference Example 5 | Less than 1 mm | Less than 1 mm | 1 to 2 mm | No |
| Reference Example 6 | 2 mm or more | Less than 1 mm | Less than 1 mm | No |
| Reference Example 8 | Generation of much foam | Less than 1 mm | Less than 1 mm | No |
| Reference Example 8 | 2 mm or more | Less than 1 mm | Less than 1 mm | No |
| Reference Example 9 | Less than 1 mm | 1 to 2 mm | 1 to 2 mm | No |
| Reference Example 10 | Raised portion of less than 1 mm | 1 to 2 mm | 1 to 2 mm | No |
| Reference Example 11 | 1 to 2 mm | Less than 1 mm | Less than 1 mm | Cracks partially present |
| Comparative Example 1 | 2 mm or more | 1 to 2 mm | 1 to 2 mm | No |

Each of the honeycomb structured bodies manufactured in Examples 1 to 3 had only a slight shrinkage (recessed portion) on the sealing material paste layer of its end face, and also had good values with respect to the parallelism and squareness.

In contrast, each of the honeycomb aggregated bodies manufactured in Reference Examples 1, 2, 6 and 8 had a tendency of having a larger shrinkage (recessed portion) on the sealing material paste layer of its end face in comparison with that of the examples. This is presumably because the drying process on the end face did not progress sufficiently.

Moreover, in each of the honeycomb aggregated bodies manufactured in Reference Examples 3 and 7, air foam was generated in the sealing material layer of its end face. This is presumably because the temperature of the end face drying process was too high.

Moreover, in the honeycomb aggregated bodies manufactured in Reference Examples 4 and 9, the parallelism of the end faces was inferior to that of the examples. In the honeycomb aggregated body manufactured in Reference Example 9, the squareness was also inferior to that of the examples. This is presumably because the pressure to be applied upon pressing the heating tool was too small.

Furthermore, in the honeycomb aggregated body manufactured in Reference Example 5, the squareness is inferior to that of the examples. This is presumably because the parallelism of the heating tools was greater than that of the heating tools used in the examples.

In the honeycomb aggregated body manufactured in Reference Example 10, the squareness and the parallelism on the end face were inferior to those of the examples, and no shrinkage (recessed portion) occurred in the sealing material layer; in contrast, the sealing material layer was protruded from the end face of the honeycomb aggregated body. This is presumably because the parallelism in the heating tools was great, with the result that the gap between the end face of the honeycomb aggregated body and the heating tool became greater, in addition, the gap between the heating tools become greater.

Moreover, in the honeycomb aggregated body manufactured in Reference Example 11, small cracks partially occurred at a portion of the end face of the honeycomb fired body in some cases. This is presumably because the pressure to be applied upon pressing the heating tool against the end face of the honeycomb aggregated body was too large.

Here, with respect to the honeycomb aggregated bodies manufactured in the respective reference examples, although their properties are inferior to those of the honeycomb aggregated bodies manufactured in the examples, they can be sufficiently used as product intermediate objects.

In contrast, on the end face of each of the honeycomb aggregated bodies manufactured in the comparative examples, the shrinkage (recessed portion) on the sealing material paste layer, the parallelism and squareness became greater respectively, making it impossible to use as even product intermediate objects.

In this manner, the method for drying an end face of a honeycomb aggregated body according to the embodiments of the present invention may make it possible to efficiently manufacture a honeycomb aggregated body that makes a shrinkage (recessed portion) or the like on the sealing material paste layer very small with a flattened end face. Moreover, by using such a honeycomb aggregated body, it may become possible to manufacture a honeycomb structured body that has an end face appearance and functionalities that satisfy a predetermined standard, and consequently to improve the efficiency of the entire manufacturing processes of the honeycomb structured body.

What is claimed as new and desired to be secured by Letters Patent of the United States is:

1. A method for manufacturing a honeycomb structured body, comprising:
    manufacturing a pillar-shaped honeycomb molded body through molding of a ceramic material, the honeycomb molded body having a structure in which a number of cells are placed in parallel with one another in the longitudinal direction with a partition wall therebetween;
    preparing a honeycomb fired body by firing the honeycomb molded body;
    manufacturing a honeycomb aggregated body by integrating a plurality of said honeycomb fired bodies with one another by interposing a sealing material paste layer that is formed on the side face of the honeycomb fired body thereafter;
    carrying out an end-face drying to dry at least an end face neighborhood of the honeycomb aggregated body by an end-face heating apparatus; and
    further drying the entire sealing material paste layer on the side face of said honeycomb fired body,
    wherein
    said end-face heating apparatus comprises a heating tool, a heating tool translation device and a holding jig, and
    said end-face drying comprises:
    holding said honeycomb aggregated body with said holding jig;
    translating said heating tool with said heating tool translation device thereafter; and
    pressing said heating tool against an end face of said honeycomb aggregated body to apply heat to the end face neighborhood of said honeycomb aggregated body so that the sealing material paste layer at the end face neighborhood is dried.

2. The method for manufacturing a honeycomb structured body according to claim 1,
    wherein
    said end-face heating apparatus comprises two of said heating tools, and
    in said end-face drying, the end face neighborhoods of both end faces of said honeycomb aggregated body are simultaneously heated by simultaneously pressing said two heating tools against both of the end faces of said honeycomb aggregated body so that the sealing material paste layers at the end face neighborhoods of both end faces are dried.

3. The method for manufacturing a honeycomb structured body according to claim 1,
    wherein
    the parallelism with respect to the contact face of said heating tool which contacts the end face of said honeycomb aggregated body is set to about 0.1 mm or less.

4. The method for manufacturing a honeycomb structured body according to claim 1, wherein said heating tool is pressed against the end face of the honeycomb aggregated body at a pressure of at least about 400 N and at most about 600 N.

5. The method for manufacturing a honeycomb structured body according to claim 1, wherein the surface temperature of said heating tool is about 200° C. or more, but less than about 400° C.

* * * * *

UNITED STATES PATENT AND TRADEMARK OFFICE
CERTIFICATE OF CORRECTION

PATENT NO. : 7,603,793 B2  Page 1 of 1
APPLICATION NO. : 11/606173
DATED : June 2, 2009
INVENTOR(S) : Takafumi Hoshino et al.

It is certified that error appears in the above-identified patent and that said Letters Patent is hereby corrected as shown below:

On the title page, item (73) Assignee: please change "Ibeden Co., Ltd. Ogaki-Shi (JP)" to --Ibiden Co., Ltd. Ogaki-Shi (JP)--

Signed and Sealed this

Twenty-second Day of December, 2009

David J. Kappos
*Director of the United States Patent and Trademark Office*